(12) United States Patent
d'Haêne et al.

(10) Patent No.: US 7,531,135 B2
(45) Date of Patent: May 12, 2009

(54) PROCESS AND SYSTEM FOR CONTROLLING A PROCESS GAS STREAM

(76) Inventors: Paul E. d'Haêne, 253, 1935-32nd Avenue, N.E., Calgary, Alberta (CA) T2E 7C8; Peter S. Schermann, De Beaufortweg 12, BW Austerlitz (NL) 3711

( * ) Notice: Subject to any disclaimer, the term of this patent is extended or adjusted under 35 U.S.C. 154(b) by 1002 days.

(21) Appl. No.: 10/890,458

(22) Filed: Jul. 13, 2004

(65) Prior Publication Data
US 2006/0014292 A1 Jan. 19, 2006

(51) Int. Cl.
G01N 21/00 (2006.01)
C01B 17/02 (2006.01)
C01B 17/00 (2006.01)
G01N 35/08 (2006.01)

(52) U.S. Cl. .......................... 422/62; 422/105; 422/107; 422/108; 422/109; 422/110; 422/111; 423/576.8; 423/567.1; 423/576.2; 423/574.1; 436/55; 700/266

(58) Field of Classification Search .................. None
See application file for complete search history.

(56) References Cited

U.S. PATENT DOCUMENTS

| | | | |
|---|---|---|---|
| 3,026,184 A | 3/1962 | Karasek | |
| 3,854,876 A | 12/1974 | Rankine et al. | |
| 3,854,884 A | 12/1974 | Robison | |
| 3,871,831 A | 3/1975 | Andral et al. | |
| 3,933,992 A | 1/1976 | Andral et al. | |
| 3,945,905 A | 3/1976 | Robison | |
| RE28,864 E | 6/1976 | Andral et al. | |
| 3,985,864 A | 10/1976 | Vautrain et al. | |
| 4,021,201 A | 5/1977 | Vautrain et al. | |

(Continued)

FOREIGN PATENT DOCUMENTS

CA 2035554 8/1991

OTHER PUBLICATIONS

"Converting Hydrogen Sulfide by the Claus Process," undated, downloaded from the website www.nelliott.demon.co.uk on Jun. 30, 2003, 3 pp.

(Continued)

*Primary Examiner*—Jill Warden
*Assistant Examiner*—Neil Turk
(74) *Attorney, Agent, or Firm*—Terrence N. Kuharchuk; Rodman & Rodman

(57) ABSTRACT

In a process and system for recovering sulfur from a process gas stream initially comprising a hydrogen sulfide containing gas and an oxygen containing gas, a control process and system respectively are provided. The sulfur recovery process includes a thermal step having a beginning followed by a catalytic step having an end. The control process includes first analyzing a composition of the process gas stream at a first location between the beginning of the thermal step and the end of the catalytic step, first controlling the oxygen containing gas having regard to that first composition, second analyzing the composition of the process gas stream at a second location downstream of the end of the catalytic step, and second controlling the oxygen containing gas having regard to that second composition. The sulfur recovery system and control system therefor are provided for performing the steps of the sulfur recovery process and control process respectively.

17 Claims, 7 Drawing Sheets

U.S. PATENT DOCUMENTS

| | | | |
|---|---|---|---|
| 4,100,266 | A | 7/1978 | Smith |
| 4,341,753 | A | 7/1982 | Mori et al. |
| 4,390,515 | A | 6/1983 | Vincent |
| 4,438,069 | A | 3/1984 | Peterman et al. |
| 4,459,275 | A | 7/1984 | Seike et al. |
| 4,836,999 | A | 6/1989 | Reed et al. |
| 4,905,160 | A | 2/1990 | Maurice et al. |
| 5,266,274 | A | 11/1993 | Taggart et al. |
| 5,494,650 | A | 2/1996 | Kvasnikoff et al. |
| 5,965,100 | A * | 10/1999 | Khanmamedov ........ 423/576.8 |
| 6,287,535 | B1 | 9/2001 | Schendel |
| 6,355,150 | B1 | 3/2002 | Savin-Poncet et al. |

OTHER PUBLICATIONS

Ortloff Engineers, Ltd., "Modified Claus Process," dated 1999, downloaded from the website www.ortloff.com, 4 pp.

NovaChem BV, "Product Brief IPM 300TG" for NovaChem IPM-Mark II IPM 300TG Tail Gas Analyzer, dated 1995-2002, 2 pp.

Ametek Process Instuments, "Model 900 Tail Gas/Air Demand Analyzer-900," dated 2000, downloaded from the website www.ametekpi.com, 3 pp.

Brimstone Instrumentation Ltd., "Model BRM 942-TG" product brochure, dated Mar. 6, 2003, 4 pp.

Applied Analytics, Inc., "TLG-837: In-Situ Tail gas analyzer" dated 1997-2003, downloaded from website www.a-a-inc.com, 5 pp.

Goar, Allison & Associates, Inc., "Superclaus," dated 2000-2002, downloaded from website www.goarallison.com, 2 pp.

"Exploring the Claus Process," The Chemical Engineers' Resource Page, undated, downloaded from website www.cheresources.com on Sep. 23, 2003, 3 pp.

Siemens AG, Claus Process Materials, dated 2001, downloaded from website dynamik.fb10.tu-berlin.de, 19 pp.

Michel Ruel, P.E., "Loop Optimization: Before You Tune," Mar. 1999, downloaded from website www.expertune.com, 5 pp.

Michel Ruel, P.E., "Regain Loop Control," dated 2002, article downloaded from website www.controldesign.com, 6 pp.

Vance J. VanDoren, "Assessing Control Loop Performance," dated May 1, 1999, article downloaded from website www.manufacturing.net, 4 pp.

"Sulphur Plant," undated, downloaded from the website www.2learn.ca on May 3, 2004, 3 pp.

Mattsson-Boze, K.W. and Lyddon, Lili G., "Using a Process Simulator to Improve Sulphur Recovery," Sulphur Jan./Feb. 1997: 37-41.

* cited by examiner

PROCESS AND SYSTEM FOR CONTROLLING A PROCESS GAS STREAM

FIELD OF INVENTION

The present invention is for use in a process and a system for recovering sulfur from a process gas stream initially comprising a hydrogen sulfide containing gas and an oxygen containing gas. Specifically, the present invention relates to a control process and a control system for controlling the amount of the oxygen containing gas in the process gas stream.

BACKGROUND OF INVENTION

Process gases, such as those resulting from gas plants and refineries or as a by-product of other industrial processes, may contain an amount of hydrogen sulfide. The recovery of sulfur from these process gases provides a valuable sulfur product. In addition, the sulfur is also preferably removed from the process gases prior to the disposal of the gas, such as through flaring or venting of the process gas to the atmosphere, in order to reduce any atmospheric pollution which may result therefrom.

Accordingly, various sulfur extraction and recovery systems have been developed. For instance, a conventional sulfur recovery process known in the industry as the "Claus process" is often utilized for the recovery of sulfur from hydrogen sulfide containing gases. Specifically, the Claus process utilizes a two step process which results in the production of elemental sulfur and a "tail gas" from the hydrogen sulfide.

The first step in the Claus process is a thermal step which combines the process gas containing the hydrogen sulfide with air or an oxygen containing gas and heating it to the necessary temperature for combustion. The air is used to facilitate the combustion of the hydrogen sulfide. The following reactions both occur in the thermal step:

$$H_2S + \tfrac{3}{2}O_2 \rightarrow SO_2 + H_2O \quad (1)$$

$$2H_2S + SO_2 \rightarrow 3S + 2H_2O \quad (2)$$

An amount of both sulfur dioxide and sulfur are typically formed in the thermal step. In addition, amounts of hydrogen sulfide and sulfur dioxide typically remain unreacted.

The products resulting from the thermal step (together with unreacted hydrogen sulfide) then undergo a second catalytic step. The catalytic step combines the products from the thermal step and hydrogen sulfide with a catalyst which results in the production of elemental sulfur and a tail gas which includes a relatively small amount of hydrogen sulfide. In particular, hydrogen sulfide is reacted with sulfur dioxide produced in the thermal step over a catalyst which is utilized to increase the rate of the chemical reaction. Where insufficient hydrogen sulfide remains unreacted from the thermal step to proceed with the catalytic step, a portion of the process gas may bypass the thermal step for use in the catalytic step. The following reaction is the predominant reaction which occurs in the catalytic step:

$$2H_2S + SO_2 \rightarrow 3S + 2H_2O \quad (2)$$

In order to improve the efficiency of the catalytic step, the catalytic step may be repeated to remove additional amounts of sulfur. Typically, the catalytic step is performed in 2 or more, typically about 2 to 4, catalytic reaction stages.

Further, where desired, the catalytic step may be followed by one or more further processing steps such as further processing of the tail gas utilizing a tail gas clean-up unit ("TGCU") or performing a SUPERCLAUS™ step utilizing a SUPERCLAUS™ catalytic reaction apparatus. The SUPERCLAUS™ catalytic reaction apparatus utilizes a specialized or improved catalyst to achieve higher conversion rates to sulfur. In particular, a selective oxidation catalyst is utilized which oxidizes the hydrogen sulfide at a high efficiency. Typically, the SUPERCLAUS™ step is performed as an adjunct to the conventional Claus process and is performed following the catalytic step, or final catalytic reaction stage, of the Claus process.

In order to facilitate or enhance the sulfur recovery rate of the Claus process and the SUPERCLAUS™ step, if utilized, the amount of air or oxygen containing gas combined with the hydrogen sulfide containing process gas in performing the thermal step is preferably optimized. Specifically, an optimal ratio of oxygen to hydrogen sulfide in the process gas, or an optimal hydrogen sulfide content, is preferably maintained. However, depending upon the source of the process gas, both the flow rate and the composition of the process gas tend to vary. A sudden change in the composition or flow rate of the process gas, causing a sudden change in the oxygen demands, is referred to as an "upset condition." During upset conditions, a resulting alteration in the ratio from the optimal tends to adversely impact upon the sulfur recovery rate. It has been found that even small temporary deviations from the optimal may cause a considerable decrease in the overall performance or efficiency of the sulfur recovery processes.

Conventionally, the air flow to the thermal step in the Claus process is controlled through feed forward and feed back control systems. The feed forward control system provides at least one flow meter for monitoring the flow rate of the hydrogen sulfide containing process gas to the thermal step. Accordingly, an upset related to the flow rate of the hydrogen sulfide containing process gas is detected by the flow meter, allowing the necessary adjustment to the air flow to be made.

In addition, a single sample feed back control system is provided which samples the process gas at a single point or location in the process. Conventionally, the feed back control involves sampling the tail gas which exits the catalytic step at a single location with an air demand analyzer, also referred to as a tail gas analyzer. The amount of air which is combined with the hydrogen sulfide containing process gas prior to the thermal step is then controlled having regard to the relative proportions or content of hydrogen sulfide ($H_2S$) and sulfur dioxide ($SO_2$), and possibly the content of carbonyl sulfide (COS) and carbon disulfide ($CS_2$), which are found in the tail gas.

Basing control of the Claus process on the composition of the tail gas in this manner provides a relatively accurate measure of process conditions. However, the disadvantage of basing control on the composition of the tail gas is that there is a relatively significant time delay between the time that the hydrogen sulfide containing process gas enters the thermal step and the time that the tail gas exits the catalytic step. Depending upon the flow rate of the gases, the number of catalytic reaction stages and other process parameters, a two to three minute time delay or more may be experienced.

As a result, during "upset conditions" where the composition, and thus the air demands, of the hydrogen sulfide containing process gas entering the thermal step changes suddenly, there is a delay of at least about two to three minutes before the control system based upon the composition of the tail gas recognizes the occurrence of the upset conditions. Furthermore, if the amount of air which is combined with the hydrogen sulfide containing process gas is then adjusted based upon upset conditions which occurred two to three minutes earlier, the adjustment may take place at a time when the upset conditions are no longer present. The end result of utilizing the composition of the tail gas as the basis of controlling the amount of air which is added to the hydrogen sulfide containing process gas before the thermal step is that the occurrence of upset conditions continue to reduce the overall efficiency of the Claus process and SUPERCLAUS™ step.

Other single sample feed back control systems suggest the sampling of the process gas nearer the end of the thermal step, as the process gas exits the reaction furnace. However, although sampling the process gas nearer the thermal step increases the speed at which the feed back is provided to the control system, it has been found that such samples provide for a relatively less accurate measure of process conditions as compared with sampling of the tail gas.

Examples of single sample feed back control systems are provided in Canadian Patent Application No. 2,035,554 published Aug. 22, 1991 by Lell, U.S. Pat. No. 3,026,184 issued Sep. 26, 1957 to Karasek and U.S. Pat. No. 6,287,535 issued Sep. 11, 2001 to Schendel. However, for the reasons discussed above, none of these control systems have been found to be fully satisfactory.

Therefore, there is a need in the industry for an improved control process and control system for controlling a sulfur recovery process and system respectively, and preferably for use with the Claus process and the SUPERCLAUS™ step. In particular, there is a need for the control process and system to enhance the overall efficiency or performance of the Claus process, and preferably the SUPERCLAUS™ step, preferably by providing an improved feed back control process and system which are both relatively accurate and relatively fast as compared with conventional feed back control processes and systems used in the industry.

SUMMARY OF INVENTION

The present invention relates to a control process and a control system for use in a sulfur recovery process and a sulfur recovery system respectively which are provided for recovering sulfur from a process gas stream initially comprising a hydrogen sulfide containing gas and an oxygen containing gas. Specifically, the control system and the control process are provided for controlling a sulfur recovery process or system comprising or performing thermal and catalytic steps. Preferably, the invention is for use in conjunction with the Claus process for sulfur recovery, which may or may not include a SUPERCLAUS™ step as an adjunct following the Claus process.

Further, the present invention is comprised of a control process and a control system for reducing the effects of upset conditions on the recovery of sulfur from the process gas stream, and particularly for reducing the effects of upset conditions related to a variation or sudden change in the composition of the process gas stream. Preferably, the control process and control system of the present invention provide for a reduction in both the duration of the upset effect and the amplitude of the upset effect.

Further, the control process and control system preferably provide for feed back control, wherein feed back relating to the composition of the process gas stream is utilized to control or vary the amount of the oxygen containing gas in the process gas stream. As a result, the ratio of hydrogen sulfide to oxygen in the process gas stream may be optimized to enhance the sulfur recovery from the process gas stream.

In a first aspect of the invention, the invention is directed at a control process in a process for recovering sulfur from a process gas stream initially comprising an amount of a hydrogen sulfide containing gas and an amount of an oxygen containing gas, the process comprising a thermal step and a catalytic step following the thermal step, the thermal step comprising a beginning and an end, the catalytic step comprising a beginning and an end, the control process comprising:

(a) first analyzing a composition of the process gas stream at a first location between the beginning of the thermal step and the end of the catalytic step;

(b) first controlling the amount of the oxygen containing gas having regard to the composition of the process gas stream at the first location;

(c) second analyzing the composition of the process gas stream at a second location downstream of the end of the catalytic step; and (d) second controlling the amount of the oxygen containing gas having regard to the composition of the process gas stream at the second location.

In a second aspect of the invention, the invention is directed at a control system in a system for recovering sulfur from a process gas stream initially comprising an amount of a hydrogen sulfide containing gas and an amount of an oxygen containing gas, the system comprising a thermal reaction apparatus, a catalytic reaction apparatus downstream of the thermal reaction apparatus, a source of the oxygen containing gas and a flow control apparatus associated with the source of the oxygen containing gas, the thermal reaction apparatus comprising an inlet and an outlet, the catalytic reaction apparatus comprising an inlet and an outlet, the control system comprising:

(a) a first analyzer for analyzing a composition of the process gas stream at a first location between the inlet of the thermal reaction apparatus and the outlet of the catalytic reaction apparatus;

(b) a first controller associated with the first analyzer and operatively connected with the flow control apparatus, for controlling the amount of the oxygen containing gas having regard to the composition of the process gas stream at the first location;

(c) a second analyzer for analyzing a composition of the process gas stream at a second location downstream of the outlet of the catalytic reaction apparatus; and (d) a second controller associated with the second analyzer and operatively connected with the flow control apparatus, for controlling the amount of the oxygen containing gas having regard to the composition of the process gas stream at the second location.

In each of the sulfur recovery process and sulfur recovery system, sulfur is recovered from a process gas stream. The process gas stream is initially comprised of an amount of a hydrogen sulfide containing gas and an amount of an oxygen containing gas. The hydrogen sulfide containing gas may be provided from any available source of hydrogen sulfide gas, such as natural or process gases containing hydrogen sulfide. For instance, the hydrogen sulfide containing gas may be comprised of a process gas resulting or arising from gas plant and refining processes or as a by-product of other industrial processes. In the preferred embodiment, the hydrogen sulfide containing gas is comprised of one or more of an amine acid gas, a sour water stripper gas and a natural gas. Amine acid gas is typically produced in refineries and gas plants from amine regenerators or strippers. Sour water stripper gas is typically produced in refineries from sour water regenerators or strippers. Natural gas is typically used during the start-up and shut-down stages of sulfur recovery plants or for keeping the plant in a "hot" stand-by mode.

However, as indicated, the hydrogen sulfide containing gas may have any source and may be comprised of any gas, preferably a process gas, which contains an amount of hydrogen sulfide. The hydrogen sulfide containing gas may be comprised of any percentage or proportion of hydrogen sulfide which is suitable for or compatible with a thermal step or a thermal reaction apparatus of a sulfur recovery process or system. Preferably, the hydrogen sulfide containing gas is comprised of a percentage or proportion of hydrogen sulfide which is typically or commonly processed by, or is otherwise suitable or compatible for processing by, the Claus process and the SUPERCLAUS™ step, if utilized.

The oxygen containing gas may have any source and may be comprised of any gas containing an amount of oxygen and suitable for combustion with the hydrogen sulfide containing gas. Further, the oxygen containing gas may be comprised of any proportion or percentage of oxygen which is suitable or compatible for combustion with the hydrogen sulfide containing gas in a thermal step or by a thermal reaction apparatus of a sulfur recovery process or system. In the preferred embodiment, the proportion or percentage of oxygen is suitable for or compatible with the Claus process and the SUPERCLAUS™ step, if utilized. In the preferred embodiment, the oxygen containing gas is comprised of air, typically containing about 21 percent oxygen.

The process gas stream for the sulfur recovery process and system is initially comprised of an amount of a hydrogen sulfide containing gas and an amount of an oxygen containing gas. The process gas stream refers to the stream or flow of the process gas through the complete or entire sulfur recovery process or system from the beginning to the end of the process or from the inlet to the outlet of the system. The beginning of the sulfur recovery process is prior to the performance of the thermal and catalytic steps. The inlet of the sulfur recovery system is upstream of the thermal reaction apparatus and the catalytic reaction apparatus. At both the beginning of the sulfur recovery process or at the inlet of the sulfur recovery system, the process gas stream is initially comprised of an amount of the hydrogen sulfide containing gas and an amount of the oxygen containing gas. These initial amounts of hydrogen sulfide containing gas and oxygen containing gas, and the initial composition of the process gas stream, will not remain constant, but rather will vary or change as the process gas stream is acted upon by the thermal and catalytic steps of the sulfur recovery process or the thermal and catalytic reaction apparatuses of the sulfur recovery system.

In the first aspect of the invention, the sulfur recovery process comprises a thermal step and a catalytic step following the thermal step. The thermal step is comprised of heating the process gas stream to the necessary temperature for combustion to produce an amount of sulfur dioxide. In addition, an amount of hydrogen sulfide may remain unreacted. In the preferred embodiment, the thermal step forms or comprises a part or step of the Claus sulfur recovery process.

Thus, the thermal step is comprised of heating the process gas stream to a sufficient temperature to achieve a desired amount or degree of combustion of the process gas stream. Further, the thermal step is comprised of a step of condensing the process gas stream. More particularly, following the heating step, the process gas stream is condensed in order to permit the removal of condensed or liquid sulfur from the process gas stream prior to further processing by the catalytic step. Thus, the condensing step is preferably comprised of cooling the process gas stream to a temperature sufficient to condense a desired amount of the gaseous sulfur to a liquid form for separation and removal from the other components of the process gas stream.

As indicated, the thermal step has a beginning and an end. The beginning of the thermal step is defined by the commencement of the heating step described above. Specifically, the beginning of the thermal step is defined by the commencement of the external application of heat, or the first or initial application of heat, to the process gas stream for the purpose of achieving the desired temperature to facilitate the combustion of the process gas stream. The end of the thermal step is defined by the completion of the condensing step and the removal of the liquid or condensed sulfur therefrom. In other words, the end of the thermal step is defined by the completion of the removal of the desired amount of condensed sulfur from the process gas stream.

The catalytic step is comprised of combining the combustion products with a catalyst to produce sulfur and a tail gas having a reduced amount of hydrogen sulfide therein. In particular, the hydrogen sulfide remaining from the thermal step is reacted with the sulfur dioxide over the catalyst. Where insufficient hydrogen sulfide remains from the thermal step to proceed with the catalytic step, a portion of the process gas stream may bypass the thermal step for use in the catalytic step. In the preferred embodiment, the catalytic step forms or comprises a part or step of the Claus sulfur recovery process.

The catalyst used in the catalytic step may be comprised of any conventional or known catalytic substance capable of, and suitable for, enhancing or improving the efficiency of the reaction of the catalytic step. In the preferred embodiment, the catalyst is any conventional or known catalyst which is typically or commonly used in, or is otherwise suitable or compatible for use in, the Claus sulfur recovery processes.

If desired, the catalytic step may be followed by a further or adjunct processing step for further processing of the process gas stream downstream of the catalytic step. For instance, the adjunct processing step may include a conventional or known tail gas cleanup process or a SUPERCLAUS™ step conducted downstream of the catalytic step, and particularly downstream of the end of the catalytic step. Preferably, the adjunct processing step is comprised of a SUPERCLAUS™ step including a catalytic reaction utilizing a selective oxidation catalyst capable of enhancing the efficiency of the oxidization of the hydrogen sulfide in the process gas stream.

The catalytic step is preferably comprised of passing the process gas stream over a catalyst to achieve a desired catalytic reaction. The catalytic step is preferably further comprised of a step of reheating the process gas stream following the thermal step. The reheating step re-heats the process gas stream to a desired temperature for the purpose of enhancing or facilitating the subsequent catalytic reaction. Finally, the catalytic step is also preferably comprised of a step of condensing the process gas stream following the catalytic reaction. More particularly, following the step of passing the process gas stream over the catalyst to achieve the desired catalytic reaction, the process gas stream is condensed in order to permit the removal of condensed or liquid sulfur from the process gas stream. Thus, the process gas stream is cooled to a temperature sufficient to condense a desired amount of the gaseous sulfur to a liquid form for separation and removal from the other components of the process gas stream.

Further, the catalytic step may be performed in one or a plurality of steps as required to remove the desired amount of sulfur from the process gas stream. Preferably, the catalytic step is comprised of an initial catalytic step and at least one subsequent catalytic step and wherein the reheating step is comprised of an initial reheating step which is associated with the initial catalytic step. Preferably, at least 2 subsequent catalytic steps are performed.

The catalytic step also has a beginning and an end. The beginning of the catalytic step is defined by the commencement of the catalytic reaction as described above. More particularly, in the preferred embodiment, the beginning of the catalytic step is defined by the commencement of the initial reheating step associated with the initial catalytic step. Specifically, the beginning of the catalyst step follows the end of the thermal step and is defined by the commencement of the application of heat, or the first or initial application of heat, to the process gas stream for the purpose of reheating the process gas stream to facilitate the subsequent catalytic reaction. The end of the catalytic step is defined by the completion of the final subsequent catalytic step, and preferably, the completion of the condensing step of the final subsequent catalytic step and the removal of the liquid or condensed sulfur therefrom. In other words, in the preferred embodiment, the end of the catalytic step is defined by the completion of the final removal of the desired amount of condensed sulfur from the process gas stream. Thus, the end of the catalytic step occurs prior to the beginning of any further adjunct processing step such as a SUPERCLAUS™ step or other conventional or known tail gas cleanup process.

As indicated, the control process is comprised of first analyzing a composition of the process gas stream at a first location between the beginning of the thermal step and the end of the catalytic step. The control process is further comprised of second analyzing the composition of the process gas stream at a second location downstream of the end of the catalytic step.

Thus, the first location may be anywhere between the beginning of the thermal step and the end of the catalytic step, However, the first location is preferably upstream of the beginning of the catalytic step. In the preferred embodiment, the catalytic step is comprised of the step of reheating the process gas stream following the thermal step and the first location is upstream of the reheating step.

Further, as stated, the first location is downstream of the beginning of the thermal step. Further, the thermal step is preferably comprised of the step of condensing the process gas stream. The first location may be upstream of the condensing step or it may be downstream of the condensing step. However, in the preferred embodiment, the first location is downstream of the end of the thermal step. Thus, the first location is preferably downstream of the condensing step.

The second location may be anywhere downstream of the end of the catalytic step. Thus, in the preferred embodiment, the second location is downstream of the final subsequent catalytic step, and particularly, downstream of the condensing step of the final subsequent catalytic step. Further, the second location is preferably upstream of any subsequent processing steps or adjunct processes which may be desired to be performed on the process gas stream. Accordingly, the second analyzing step analyzes the composition of the process gas stream following the end of the catalytic step and prior to the beginning of any adjunct processing steps which may significantly or substantially alter the composition of the process gas stream. The beginning of the adjunct processing step is defined by the commencement of the further processing of the process gas stream. Thus, for instance, where a SUPERCLAUS™ step is performed following the catalytic step, the second location is upstream of the beginning of the SUPERCLAUS™ step. The beginning of the SUPERCLAUS™ step is defined by the commencement of the catalytic reaction thereof.

In addition, the first analyzing step and the second analyzing step are each preferably comprised of analyzing the composition of the process gas stream with respect to the hydrogen sulfide and sulfur dioxide content. The composition of the process gas stream with respect to the hydrogen sulfide and sulfur dioxide content provides an indication or measure of the efficiency of the combustion reaction of the thermal step. In addition, where desired, one or both of the first and second analyzing steps may further analyze the composition of the process gas stream with respect to one or more further chemical constituents such as carbonyl sulfide or carbon disulfide.

The first and second analyzing steps may each be performed in any manner and by any type or configuration of analyzer or analyzing mechanism or device capable of, and suitable for, providing the desired analysis or measure of the composition of the process gas stream at the first and second locations respectively. However, preferably, the first analyzing step is comprised of the following steps: (i) obtaining a sample of the process gas stream at the first location; and (ii) analyzing the sample to obtain a first measured indication which is reflective of the hydrogen sulfide and sulfur dioxide content of the sample. In addition, preferably, the second analyzing step is comprised of the following steps: (i) obtaining a sample of the process gas stream at the second location; and (ii) analyzing the sample to obtain a second measured indication which is reflective of the hydrogen sulfide and sulfur dioxide content of the sample.

In the first aspect of the invention, the control process is further comprised of first controlling the amount of the oxygen containing gas having regard to the composition of the process gas stream at the first location and second controlling the amount of the oxygen containing gas having regard to the composition of the process gas stream at the second location. The first and second controlling steps may each be performed in any manner and by any type or configuration of controller or control mechanism or device capable of, and suitable for, controlling the amount of the oxygen containing gas having regard to the composition of the process gas stream at the first and second locations respectively.

However, preferably, the first controlling step is comprised of the following steps: (i) comparing the first measured indication with a first target indication which is reflective of a target hydrogen sulfide and a target sulfur dioxide content of the process gas stream at the first location in order to obtain a first comparison parameter; (ii) generating a first control signal from the first comparison parameter; and (iii) using the first control signal to control the amount of the oxygen containing gas. In addition, preferably, the second controlling step is comprised of the following steps: (i) comparing the second measured indication with a second target indication which is reflective of a target hydrogen sulfide and a target sulfur dioxide content of the process gas stream at the second location in order to obtain a second comparison parameter; (ii) generating a second control signal from the second comparison parameter; and (iii) using the second control signal to control the amount of the oxygen containing gas.

The first and second controlling steps may be performed as distinct or separate steps in controlling the amount of the oxygen containing gas, as described above. However, in the preferred embodiment, the first controlling step and the second controlling step are comprised of a combined controlling step. The combined controlling step may be performed in any manner and by any type or configuration of controller or control mechanism or device capable of, and suitable for, controlling the amount of the oxygen containing gas.

However, preferably, the combined controlling step is comprised of the following steps: (i) comparing the first measured indication with a first target indication which is reflective of a target hydrogen sulfide and a target sulfur dioxide content of the process gas stream at the first location in order to obtain a first comparison parameter; (ii) comparing the second measured indication with a second target indication which is reflective of a target hydrogen sulfide and a target sulfur dioxide content of the process gas stream at the second location in order to obtain a second comparison parameter; (iii) generating a combined control signal from the first comparison parameter and the second comparison parameter; and (iv) using the combined control signal to control the amount of the oxygen containing gas.

The sulfur recovery process, and the control process associated therewith, may be performed using any sulfur recovery system or unit and any control system therefor which are compatible with and suitable for performing or conducting the processes described herein. However, in the preferred embodiment, the sulfur recovery process and the control process associated therewith of the present invention are performed using the sulfur recovery system and the associated control system of the present invention as described herein.

In the second aspect of the invention, the sulfur recovery system comprises a thermal reaction apparatus and a catalytic reaction apparatus downstream of the thermal reaction apparatus. The thermal reaction apparatus may be comprised of any heater, burner, furnace or other heating or combusting mechanism, device or apparatus capable of, and suitable for, performing the thermal step, and particularly the preferred embodiment of the thermal step, as discussed above. In the preferred embodiment, the thermal reaction apparatus comprises a part or component of a conventional or known Claus sulfur recovery unit or system.

As indicated, the thermal reaction apparatus is comprised of a heater or furnace for heating the process gas stream to a sufficient temperature to achieve a desired amount or degree of combustion of the process gas stream. Further, the thermal reaction apparatus is comprised of a condenser for condensing the process gas stream. More particularly, downstream of the heater or furnace, the process gas stream enters the condenser to perform the condensing step described above prior to further processing of the process gas stream by the catalytic reaction apparatus. Thus, the condenser may be comprised of any mechanism, apparatus or device capable of condensing the process gas stream or cooling the process gas stream to a temperature sufficient to condense a desired amount of the gaseous sulfur to a liquid form for separation and removal from the other components of the process gas stream.

As indicated, the thermal reaction apparatus is comprised of an inlet and an outlet. The inlet of the thermal reaction apparatus is defined by the point or location of entry or passage of the process gas stream into the thermal reaction apparatus. Preferably, the inlet of the thermal reaction apparatus is defined by the point or location of entry or passage of the process gas stream into the heater or furnace provided for heating the process gas stream to the desired temperature for the combustion of the process gas stream. The outlet of the thermal reaction apparatus is defined by the point or location of exit or passage of the process gas stream out of the thermal reaction apparatus. Preferably, the outlet of the thermal reaction apparatus is defined by the point or location of exit or passage of the process gas stream out of the condenser following the separation and removal of the liquid or condensed sulfur therefrom.

The catalytic reaction apparatus may be comprised of any catalytic reactor, mechanism or device capable of, and suitable for, performing the catalytic step as discussed above. In the preferred embodiment, the catalytic reaction apparatus comprises a part or component of a conventional or known Claus sulfur recovery unit or system.

If desired, the catalytic reaction apparatus may communicate with further or adjunct equipment for further processing of the process gas stream downstream of the catalytic reaction apparatus. For instance, the adjunct equipment may include a conventional or known tail gas cleanup unit ("TGCU") or a SUPERCLAUS™ catalytic reaction apparatus positioned downstream of the catalytic reaction apparatus, and particularly downstream of the outlet of the catalytic reaction apparatus. Preferably, the adjunct equipment is comprised of a SUPERCLAUS™ catalytic reaction apparatus including a catalytic reactor utilizing a selective oxidation catalyst. However, any known or conventional catalytic reactor capable of, and suitable for, performing the SUPERCLAUS™ step may be utilized.

The catalytic reaction apparatus is preferably comprised of a catalytic reactor for passing or conducting the process gas stream over the catalyst to achieve a desired catalytic reaction. The catalytic reaction apparatus is preferably further comprised of a reheater or other suitable heating device or mechanism for reheating the process gas stream. The reheater is preferably located downstream of the thermal reaction apparatus, and particularly downstream of the outlet thereof. The reheater re-heats the process gas stream to a desired temperature for the purpose of enhancing or facilitating the subsequent action of the catalytic reactor. Finally, the catalytic reaction apparatus is also preferably comprised of a condenser for condensing the process gas stream. More particularly, downstream of the catalytic reactor, the process gas stream enters the condenser to perform the condensing step described above prior to further processing of the process gas stream. Thus, the condenser may be comprised of any mechanism, apparatus or device capable of condensing the process gas stream or cooling the process gas stream to a temperature sufficient to condense a desired amount of the gaseous sulfur to a liquid form for separation and removal from the other components of the process gas stream.

Further, the catalytic reaction apparatus may be comprised of one or a plurality of catalytic reaction apparatuses as required to remove the desired amount of sulfur from the process gas stream. Preferably, the catalytic reaction apparatus is comprised of an initial catalytic reaction apparatus and at least one subsequent catalytic reaction apparatus and wherein the reheater is comprised of an initial reheater which is associated with the initial catalytic reaction apparatus. Preferably, the catalytic reaction apparatus is comprised of at least 2 subsequent catalytic reaction apparatuses.

The catalytic reaction apparatus is also comprised of an inlet and an outlet. The inlet of the catalytic reaction apparatus is defined by the point or location of entry or passage of the process gas stream into the catalytic reaction apparatus. Preferably, the inlet of the catalytic reaction apparatus is defined by the point or location of entry or passage of the process gas stream into the reheater, particularly the initial reheater of the initial catalytic reaction apparatus, for reheating the process gas stream to the desired temperature for the subsequent catalytic reaction. Thus, the inlet of the catalytic reaction apparatus is located downstream of the outlet of the thermal reaction apparatus. The outlet of the catalytic reaction apparatus is defined by the point or location of exit or passage of the process gas stream out of the catalytic reaction apparatus. Preferably, the outlet of the catalytic reaction apparatus is defined by the point or location of exit or passage of the process gas stream out of the final subsequent catalytic reaction apparatus in series, and preferably, out of the condenser of the final subsequent catalytic reaction apparatus following the separation and removal of the liquid or condensed sulfur therefrom.

Thus, the outlet of the catalytic reaction apparatus is upstream of any subsequent or further processing equipment provided for the process gas stream as an adjunct to the sulfur recovery system of the present invention, and particularly, as an adjunct for a Claus sulfur recovery unit or system. For instance, the outlet of the catalytic reaction apparatus is upstream of any desired adjunct equipment such as a tail gas cleanup unit ("TGCU") or SUPERCLAUS™ catalytic reaction apparatus.

In addition, the sulfur recovery system of the present invention is further comprised of a source of the oxygen containing gas and a flow control apparatus associated with the source of the oxygen containing gas. The flow control apparatus may be comprised of any device or mechanism capable of, and suitable for, controlling the flow of the oxygen containing gas from the source. Preferably, the flow control apparatus is comprised of one or more valves associated with the source to control or vary the flow of the oxygen containing gas from the source for combining with the hydrogen sulfide containing gas. In the preferred embodiment, the flow control apparatus is comprised of at least two valves.

As indicated, the control system is comprised of a first analyzer for analyzing a composition of the process gas stream at a first location between the inlet of the thermal reaction apparatus and the outlet of the catalytic reaction apparatus. The control system is further comprised of a second analyzer for analyzing a composition of the process gas stream at a second location downstream of the outlet of the catalytic reaction apparatus.

Thus, the first location may be anywhere between the inlet of the thermal reaction apparatus and the outlet of the catalytic reaction apparatus. However, the first location is preferably upstream of the inlet of the catalytic reaction apparatus. In the preferred embodiment, the catalytic reaction apparatus is comprised of a reheater for reheating the process gas stream and the first location is upstream of the reheater.

Further, as stated, the first location is downstream of the inlet of the thermal reaction apparatus. Further, the thermal reaction apparatus is preferably comprised of the condenser for condensing the process gas stream. The first location may be upstream of the condenser or it may be downstream of the condenser. However, in the preferred embodiment, the first location is downstream of the outlet of the thermal reaction apparatus. Thus, the first location is preferably downstream of the condenser.

The second location may be anywhere downstream of the outlet of the catalytic reaction apparatus. Thus, in the preferred embodiment, the second location is downstream of the final subsequent catalytic reaction apparatus in series, and particularly, downstream of the condenser of the final subsequent catalytic reaction apparatus. Further, the second location is preferably upstream of an inlet of any subsequent or further processing equipment provided as an adjunct to the sulfur recovery system. Thus, the second analyzer preferably analyzes the composition of the process gas stream downstream of the catalytic reaction apparatus and upstream of any adjunct equipment which may significantly or substantially alter the composition of the process gas stream. Thus, for instance, where a SUPERCLAUS™ catalytic reaction apparatus is located downstream of the catalytic reaction apparatus, the second location is preferably upstream of the inlet of the SUPERCLAUS™ catalytic reaction apparatus. The inlet of the adjunct equipment, and particularly, the SUPERCLAUS™ catalytic reaction apparatus, is defined by the point or location of entry or passage of the process gas stream therein.

In addition, the first analyzer and the second analyzer are each preferably configured to analyze the composition of the process gas stream with respect to the hydrogen sulfide and sulfur dioxide content. In addition, where desired, one or both of the first analyzer and the second analyzer may further be configured to analyze the composition of the process gas stream with respect to one or more further chemical constituents such as carbonyl sulfide or carbon disulfide.

The first and second analyzers may each be comprised of any type or configuration of analyzer or analyzing device or mechanism capable of, and suitable for, providing the desired analysis or measure of the composition of the gas stream at the first and second locations respectively. More particularly, the first and second analyzers are each preferably comprised of any type or configuration of analyzer or analyzing device or mechanism capable of, and suitable for, performing the first and second analyzing steps respectively, as described above. In the preferred embodiment, the first analyzer is configured to perform the following tasks: (i) obtain a sample of the process gas stream at the first location; and (ii) analyze the sample to obtain a first measured indication which is reflective of the hydrogen sulfide and sulfur dioxide content of the sample. In addition, in the preferred embodiment, the second analyzer is configured to perform the following tasks: (i) obtain a sample of the process gas stream at the second location; and (ii) analyze the sample to obtain a second measured indication which is reflective of the hydrogen sulfide and sulfur dioxide content of the sample.

In the second aspect of the invention, the control system is further comprised of the first controller and the second controller. The first controller is associated with the first analyzer and operatively connected with the flow control apparatus, for controlling the amount of the oxygen containing gas having regard to the composition of the process gas stream at the first location. The second controller is associated with the second analyzer and operatively connected with the flow control apparatus, for controlling the amount of the oxygen containing gas having regard to the composition of the process gas stream at the second location. The first and second controllers may each be comprised of any type or configuration of controller or controlling device or mechanism capable of, and suitable for, controlling the amount of the oxygen containing gas having regard to the composition of the process gas stream at the first and second locations respectively. More particularly, the first and second controllers are each preferably comprised of any type or configuration of controller or controlling device or mechanism capable of, and suitable for, performing the first and second controlling steps respectively, as described above.

Thus, the first controller is preferably configured to perform the following tasks: (i) compare the first measured indication with a first target indication which is reflective of a target hydrogen sulfide and a target sulfur dioxide content of the process gas stream at the first location in order to obtain a first comparison parameter; (ii) generate a first control signal from the first comparison parameter; and (iii) transmit the first control signal to the flow control apparatus in order to control the amount of the oxygen containing gas. In addition, the second controller is preferably configured to perform the following tasks: (i) compare the second measured indication with a second target indication which is reflective of a target hydrogen sulfide and a target sulfur dioxide content of the process gas stream at the second location in order to obtain a second comparison parameter; (ii) generate a second control signal from the second comparison parameter; and (iii) transmit the second control signal to the flow control apparatus in order to control the amount of the oxygen containing gas.

The first and second controllers may each be comprised of a distinct or separate control mechanism or device which operates independently of the other control mechanism, as described above. However, in the preferred embodiment, the first controller and the second controller are comprised of a combined controller apparatus. The combined controller apparatus may be comprised of any type or configuration of controller or controlling device or mechanism capable of, and suitable for, controlling the amount of the oxygen containing gas. More particularly, the combined controller apparatus is preferably comprised of any type or configuration of controller or controlling device or mechanism capable of, and suitable for, performing the combined controller step, as described above.

In the preferred embodiment, the combined controller apparatus is configured to perform the following tasks: (i) compare the first measured indication with a first target indication which is reflective of a target hydrogen sulfide and a target sulfur dioxide content of the process gas stream at the first location in order to obtain a first comparison parameter; (ii) compare the second measured indication with a second target indication which is reflective of a target hydrogen sulfide and a target sulfur dioxide content of the process gas stream at the second location in order to obtain a second comparison parameter; (iii) generate a combined control signal from the first comparison parameter and the second comparison parameter; and (iv) transmit the combined control signal to the flow control apparatus in order to control the amount of the oxygen containing gas.

With respect to both the control process and the control system of the present invention, references are made herein to the first and second measured indications which are reflective of the hydrogen sulfide and sulfur dioxide content. Further, references are made herein to the first and second target indications which are reflective of a target hydrogen sulfide and a target sulfur dioxide content. The measured and target indications may be reflective of a particular hydrogen sulfide and sulfur dioxide content in any manner or by any measure. For instance, the measured and target indications may provide a measure or quantification of the ratio of hydrogen sulfide to sulfur dioxide. Alternately, the measured and target indications may provide a measure or quantification of the actual content or amount of one or both of the hydrogen sulfide and sulfur dioxide.

SUMMARY OF DRAWINGS

Embodiments of the invention will now be described with reference to the accompanying drawings, in which.

DETAILED DESCRIPTION

Figure 1:
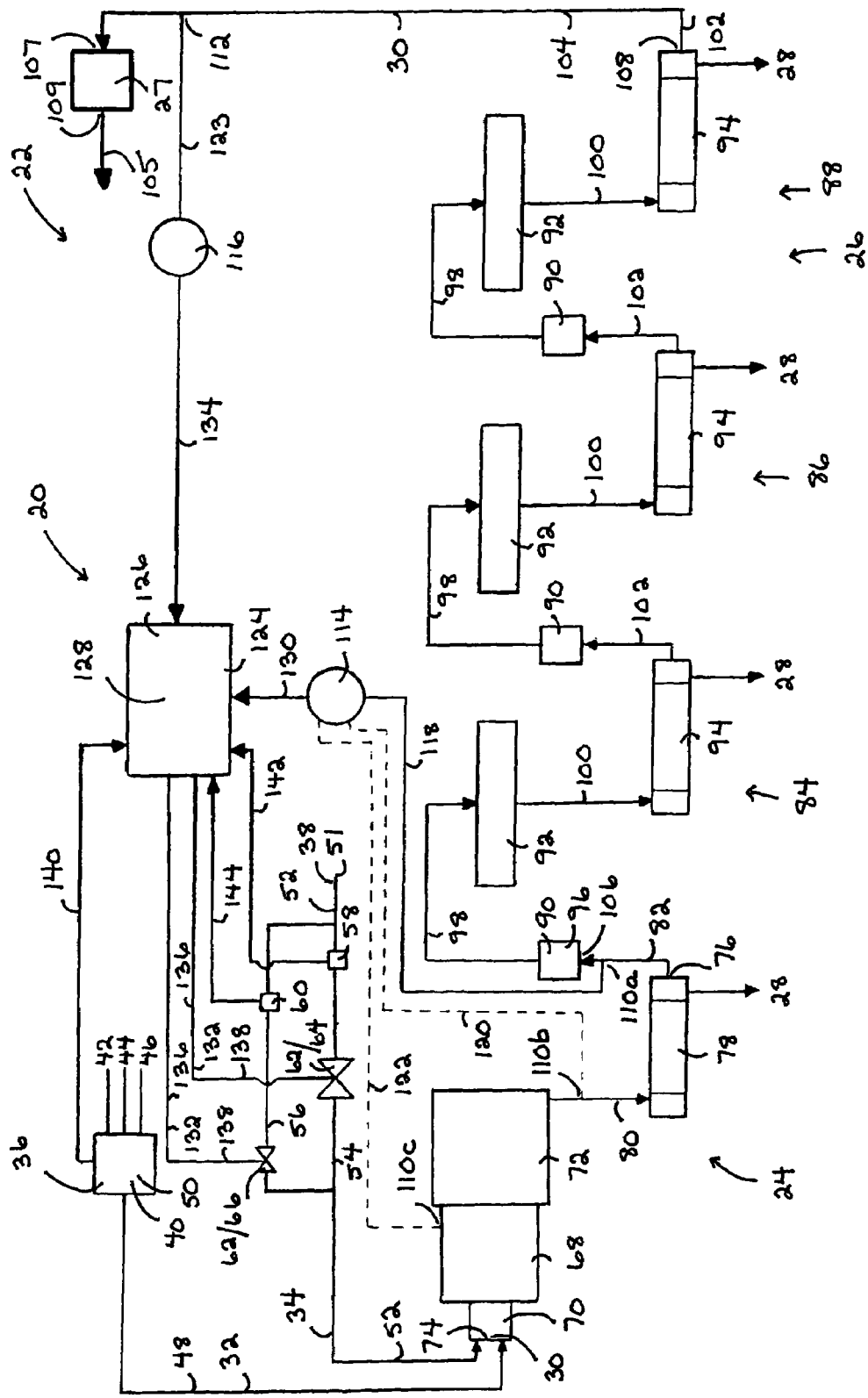
FIG. 1 is a schematic diagram of a process and a system for recovering sulfur from a process gas stream comprising a preferred embodiment of a control process and a control system of the present invention.

Referring to FIG. 1, the present invention is directed at a control process and a control system (20) for use in conjunction or association with a sulfur recovery process or sulfur recovery system or unit (22) respectively. Preferably, the sulfur recovery process is comprised of a thermal step and a catalytic step. The sulfur recovery system (22) is preferably comprised of a thermal reaction apparatus (24) for performing the thermal step and a catalytic reaction apparatus (26) for performing the catalytic step. More particularly, in the preferred embodiment of the control process of the present invention, the control process is used in association or conjunction with a Claus sulfur recovery process which comprises the thermal and catalytic steps. Further, in the preferred embodiment of the control system (20) of the present invention, the control system (20) is used in association or conjunction with a Claus sulfur recovery system or unit which comprises the thermal and catalytic reaction apparatuses (24, 26).

Further, where desired, the catalytic step may be followed by a further or adjunct processing step. For instance, the adjunct processing step may include a conventional or known tail gas cleanup process or a SUPERCLAUS™ step conducted downstream of the catalytic step. Preferably, the adjunct processing step is comprised of a SUPERCLAUS™ step. Thus, where desired, the catalytic reaction apparatus

(26) may communicate with further or adjunct equipment (27) downstream of the catalytic reaction apparatus (26). For instance, the adjunct equipment (27) may include a conventional or known tail gas cleanup unit or a SUPERCLAUS™ catalytic reaction apparatus. Preferably, the adjunct equipment (27) is comprised of a SUPERCLAUS™ catalytic reaction apparatus.

The sulfur recovery process and system (22) are provided for recovering sulfur (28) from a process gas stream (30). The process gas stream (30) is initially comprised of an amount of a hydrogen sulfide containing gas (32) and an amount of an oxygen containing gas (34). Thus, the sulfur recovery system (22) is comprised of a source (36) of the hydrogen sulfide containing gas (32) and a source (38) of the oxygen containing gas (34).

The source (36) of the hydrogen sulfide containing gas (32) may be comprised of any mechanism, device or gas stream capable of providing a gas containing a desired amount of hydrogen sulfide therein. In the preferred embodiment, the source (36) is comprised of a manifold (40) associated with various hydrogen sulfide containing gas streams. In the preferred embodiment, the hydrogen sulfide containing gas (32) is comprised of one or more of an amine acid gas, a sour water stripper gas and a natural gas. The amine acid gas is provided from an amine acid gas stream (42), the sour water stripper gas is provided from a sour water stripper gas stream (44) and the natural gas is provided from a natural gas stream (46). Each of these streams (42, 44, 46) is gathered and combined together by the manifold (40) to provide the hydrogen sulfide containing gas (32). Where necessary to achieve or provide a desired initial amount of hydrogen sulfide in the hydrogen sulfide containing gas (32) provided by the source (36), additional hydrogen sulfide may be combined with the streams (42, 44, 46).

The hydrogen sulfide containing gas (32) provided by the source (36) is preferably comprised of a percentage or proportion of hydrogen sulfide which is suitable or compatible for processing by the Claus sulfur recovery process and system (22). In addition, where a SUPERCLAUS™ step is performed or a SUPERCLAUS™ catalytic reaction apparatus (27) is utilized, the proportion or percentage of hydrogen sulfide in the hydrogen sulfide containing gas (32) is also suitable or compatible therewith.

The source (36) of the hydrogen sulfide containing gas (32) is further comprised of at least one hydrogen sulfide containing gas line or conduit (48) for conducting the hydrogen sulfide containing gas (32) downstream for combining with the oxygen containing gas (34) in order to provide the process gas stream (30) for further processing. Preferably, at least one flowmeter (50), flow monitor or other suitable device or apparatus for monitoring the flow of the hydrogen sulfide containing gas (32) is provided. The flowmeter (50) is associated with the source (36) of the hydrogen sulfide containing gas (32), and in particular, is preferably associated with the hydrogen sulfide containing gas line (48) such that the flow of the hydrogen sulfide containing gas (32) to the process gas stream (30) may be monitored to assist in controlling the overall sulfur recovery process and system (22), as described further below. As well, if desired, at least one suitable flow control apparatus (not shown), such as one or more compatible valves, may also be associated with the source (36) of the hydrogen sulfide containing gas (32), such as with the hydrogen sulfide containing gas line (48), for varying or adjusting the flow of the hydrogen sulfide containing gas (32) to the process gas stream (30). In addition, if desired, rather than a single flowmeter (50) and valve, separate or distinct flowmeters and/or valves may be provided for each of the amine acid gas stream (42), the sour water stripper gas stream (44) and the natural gas stream (46) to permit greater monitoring and control of the hydrogen sulfide gas containing gas (32) formed thereby.

The source (38) of the oxygen containing gas (34) may be comprised of any mechanism or device capable of providing a gas containing a desired amount of oxygen therein. In the preferred embodiment, the proportion or percentage of oxygen in the oxygen containing gas (34) is suitable or compatible for processing with the Claus sulfur recovery process and system (22). In addition, where a SUPERCLAUS™ step is performed or a SUPERCLAUS™ catalytic reaction apparatus (27) is utilized, the proportion or percentage of oxygen in the oxygen containing gas (34) is also suitable or compatible therewith. In the preferred embodiment, the oxygen containing gas (34) is comprised of air and therefore, the source (38) of the oxygen containing gas (34) is comprised of an air supply (51).

The source (38) of the oxygen containing gas (34) is further comprised of at least one oxygen containing gas line or conduit (52) for conducting the oxygen containing gas (34) downstream for combining with the hydrogen sulfide containing gas (32) in order to provide the process gas stream (30) for further processing. In the preferred embodiment, the oxygen containing gas line (52) is comprised of a main line portion (54) and a trim line portion (56).

In addition, at least one flowmeter, flow monitor or other suitable device or apparatus for monitoring the flow of the oxygen containing gas (34) is provided. The oxygen containing gas flowmeter is associated with the source (38) of the oxygen containing gas (34), and preferably is associated with the oxygen containing gas line (52) such that the flow of the oxygen containing gas (34) to the process gas stream (30) may be monitored to assist in controlling the overall sulfur recovery process and system (22), as described further below. In the preferred embodiment, a flowmeter, flow monitor or other suitable monitoring device or apparatus is associated with and provided for each of the main line portion (54) and the trim line portion (56) of the oxygen containing gas line (52). In particular, a main flowmeter (58) is associated with the main line portion (54) for monitoring the flow of the oxygen containing gas (34) therethrough, while a trim flowmeter (60) is associated with the trim line portion (56) for monitoring the flow of the oxygen containing gas (34) therethrough.

Finally, at least one flow control apparatus (62) is associated with the source (38) of the oxygen containing gas (34), and preferably is associated with the oxygen containing gas line (52), for varying or adjusting the flow of the oxygen containing gas (34) to the process gas stream (30). In the preferred embodiment, a flow control apparatus (62) is associated with each of the main line portion (54) and the trim line portion (56) of the oxygen containing gas line (52) to vary or adjust the flow of the oxygen containing gas (34) therethrough. Each flow control apparatus (62) may be comprised of any control mechanism or device, valve or valve structure capable of adjusting or varying the flow of the oxygen containing gas (34) through the oxygen containing gas line (52). Preferably, each flow control apparatus (62) is comprised of a valve. In the preferred embodiment, the flow control apparatus (62) associated with the main line portion (54) is comprised of a main valve (64), while the flow control apparatus (62) associated with the trim line portion (56) is comprised of a trim valve (66).

Preferably, a proportionately or relatively larger portion or percentage of the total oxygen containing gas (34) is conducted through the main line portion (54) as compared with the trim line portion (56). Thus, the main valve (64) is used to control a proportionately or relatively larger portion or percentage of the total oxygen containing gas (34) passing through the oxygen containing gas line (52) to combine with the hydrogen sulfide containing gas (32) gas as compared with the trim valve (66). In the preferred embodiment, the main line portion (54) carries or conducts about 90 percent of the total flow of the oxygen containing gas (34), while the trim line portion (56) carries or conducts about the remaining 10 percent of the total flow. Thus, adjustment of the main valve (64) typically causes a relatively faster but less accurate or courser adjustment to or variation of the flow, while the trim valve (66) typically causes a relatively slower but more accurate or finer adjustment to or variation of the flow.

The process gas stream (30) is initially comprised of an amount of the hydrogen sulfide containing gas (32) and an amount of the oxygen containing gas (34). In the preferred embodiment, the initial amount of the oxygen containing gas (34) relative or proportionate to the hydrogen sulfide containing gas (32) is controlled primarily through operation and adjustment of the main and trim valves (64, 66). As the process gas stream (30) is conducted or passes through the subsequent process steps or downstream components of the system (22), these initial amounts will vary or change as the process gas stream (30) is acted upon by the thermal and catalytic steps of the sulfur recovery process or the thermal and catalytic reaction apparatuses (24, 26) of the sulfur recovery system (22). In other words, these initial amounts of hydrogen sulfide containing gas (32) and oxygen containing gas (34), and thus the initial composition of the process gas stream (30), will not remain constant.

As stated, the sulfur recovery process is comprised of the thermal step and the catalytic step following the thermal step. The sulfur recovery system (22) is comprised of the thermal reaction apparatus (24) and the catalytic reaction apparatus (26) downstream of the thermal reaction apparatus (24). The thermal reaction apparatus (24) is provided for performing the thermal step, and particularly, for heating the process gas stream (30) to the necessary temperature for combustion to produce an amount of sulfur dioxide ($SO_2$). In particular, the process gas stream (30) is heated to a sufficient temperature to achieve a desired amount or degree of combustion of the process gas stream (30).

In the preferred embodiment, the thermal reaction apparatus (24) is comprised of a heater or reaction furnace (68), which may also be referred to as the mixing chamber. Further, the reaction furnace (68) is comprised of a burner (70) for igniting the process gas stream (30) as it enters or passes into the reaction furnace (68) for combustion. The oxygen in the process gas stream (30) facilitates the combustion of the hydrogen sulfide. In particular, the hydrogen sulfide is partially oxidized in the reaction furnace (68), forming an amount of sulfur and sulfur dioxide. In addition, the thermal reaction apparatus (24) is preferably comprised of a waste heat boiler (72) for recovering a portion of the heat energy generated by the combustion in the reaction furnace (68) such that the heat energy may be utilized in subsequent steps of the sulfur recovery process. In particular, the hot combustion products from the reaction furnace (68) enter the waste heater boiler (72) and are partially cooled by generating steam.

The thermal reaction apparatus (24) is comprised of an inlet (74) and an outlet (76). Preferably, the inlet (74) of the thermal reaction apparatus (24) is defined by the point or location of first entry or passage of the process gas stream (30) into the reaction furnace (68). In the preferred embodiment, the hydrogen sulfide containing gas line (48) and the oxygen containing gas line (52) are each associated with the reaction furnace (68), and particularly the burner (70), such that the process gas stream (30) is formed as the hydrogen sulfide containing gas (32) and the oxygen containing gas (34) pass through the inlet (74) of the reaction furnace (68). Similarly, the thermal step has a beginning and an end. In the preferred embodiment, the beginning of the thermal step is defined by the initial application of heat to the process gas stream (30) which is formed as the hydrogen sulfide containing gas (32) and the oxygen containing gas (34) pass through the inlet (74) of the reaction furnace (68).

The thermal step is preferably further comprised of condensing the process gas stream (30) following combustion in order to permit the removal of any condensed or liquid sulfur from the process gas stream (30) prior to further processing by the catalytic step. Accordingly, in the preferred embodiment of the sulfur recovery system (22), the thermal reaction apparatus (24) is comprised of a condenser (78), also referred to herein as the thermal condenser, for performing the condensing step. The thermal condenser (78) is located downstream of the waste heat boiler (72). In particular, the waste heat boiler (72) is connected, or otherwise associated with, the thermal condenser (78) by a line or conduit (80), also referred to herein as the boiler line, extending therebetween. Thus, the process gas stream (30) is conducted by or through the boiler line (80) from the waste heat boiler (72) to the thermal condenser (78). The thermal condenser (78) cools the process gas stream (30) therein and any condensed or liquid sulfur (28) is removed therefrom. The process gas stream (30) then exits or passes out of the thermal condenser (78) for further processing.

Preferably, the outlet (76) of the thermal reaction apparatus (24) is defined by the point or location of exit or passage of the process gas stream (30) out of the thermal condenser (78). More particularly, the thermal condenser (78) is connected, or otherwise associated with, the catalytic reaction apparatus (26) by a line or conduit (82), also referred to herein as the thermal condenser line, extending therebetween. Thus, the process gas stream (30) is conducted by or through the thermal condenser line (82) from the thermal condenser (78) to the catalytic reaction apparatus (26). Thus, in the preferred embodiment, the outlet (76) of the thermal reaction apparatus (24) is defined by the point or location of exit or passage of the process gas stream (30) out of the thermal condenser (78) into the thermal condenser line (82). Further, in the preferred embodiment, the end of the thermal step is defined by the completion of the condensing step, and particularly by the passage of the process gas stream (30) through the outlet (76) of the thermal reaction apparatus (24), and particularly, out of the thermal condenser (78).

The process gas stream (30) then undergoes the catalytic step. In the preferred embodiment, the catalytic reaction apparatus (26) is utilized or provided for performing the catalytic step. The catalytic step passes or conducts the process gas stream (30) exiting from the thermal reaction apparatus (24) over a suitable catalyst to produce an amount of elemental sulfur (28). The catalytic step may be performed in one or a plurality of steps as required to remove the desired amount of sulfur (28) from the process gas stream (30). In the preferred embodiment, the catalytic step is comprised of an initial catalytic step and two subsequent catalytic steps, for a total of three catalytic steps. Accordingly, in the preferred embodiment, the catalytic reaction apparatus (26) is comprised of an initial catalytic reaction apparatus (84) for performing an initial catalytic step, a first subsequent catalytic reaction apparatus (86) for performing a first subsequent catalytic step and a second subsequent catalytic reaction apparatus (88) for performing a second subsequent catalytic step.

With the possible exception of the catalyst used therein, each catalytic step and each catalytic reaction apparatus (84, 86, 88) is preferably substantially similar or identical to the others, wherein each step or apparatus removes an additional amount of sulfur (28) from the process gas stream (30).

In the preferred embodiment, each catalytic step is preferably comprised of the steps of reheating the process gas stream (30) following the thermal step, followed by the step of reacting the process gas stream (30) with the catalyst and subsequently condensing or cooling the process gas stream (30) in order to permit the removal of any condensed or liquid sulfur (28) therefrom. Similarly, in the preferred embodiment, each of the initial and subsequent catalytic reaction apparatuses (84, 86, 88) is comprised of a reheater (90), a catalytic reactor (92) and a condenser (94), also referred to herein as the catalytic condenser.

The reheater (90) is provided for performing the reheating step. The reheater (90) of the initial catalytic reaction apparatus (84), also referred to herein as the initial reheater (96), is connected, or otherwise associated with, the thermal condenser (78) by the thermal condenser line (82) extending therebetween. Thus, the process gas stream (30) is conducted by or through the thermal condenser line (82) from the thermal condenser (78) to the initial reheater (96). Each catalytic reactor (92) is located downstream of its respective reheater (90) and is provided for passing or conducting the process gas stream (30) over the catalyst to achieve the desired catalytic reaction. Each reheater (90) is connected, or otherwise associated with, the catalytic reactor (92) located downstream thereof by a reheater line or conduit (98) extending therebetween. Each catalytic condenser (94) is located downstream of its respective catalytic reactor (92) and is provided for condensing or cooling the process gas stream (30) to permit the separation and removal of any further sulfur (28) therefrom. Each catalytic reactor (92) is connected, or otherwise associated with, the catalytic condenser (94) located downstream thereof by a reactor line or conduit (100) extending therebetween.

Finally, a catalytic condenser line or conduit (102) is connected with each catalytic condenser (94) to permit the process gas stream to exit or pass out of the catalytic condenser (94). With respect to the initial and first subsequent catalytic reaction apparatuses (84, 86), the catalytic condenser line (102) extends between and connects the catalytic condenser (94) with the downstream first and second catalytic reaction apparatuses (86, 88) respectively. The catalytic condenser line (102) of the second subsequent catalytic reaction apparatus (88), also referred to herein as the tail gas line or conduit (104), conducts the process gas stream (30) away from the catalytic reaction apparatus (26) for further processing by an adjunct processing step or adjunct equipment (27), as described further below, or for venting, incineration or disposal in an alternate manner.

The catalytic reaction apparatus (26) is comprised of an inlet (106) and an outlet (108). Preferably, the inlet (106) of the catalytic reaction apparatus (26) is defined by the point or location of first entry or passage of the process gas stream (30) into the catalytic reaction apparatus (26). In the preferred embodiment, the inlet (106) is defined by the point or location of entry or passage of the process gas stream (30) into the initial reheater (96) of the initial catalytic reaction apparatus (84) from the thermal condenser line (82). Similarly, the catalytic step has a beginning and an end. Preferably, the beginning of the catalytic step is defined by the commencement of the initial reheating step associated with the initial catalytic step. In the preferred embodiment, the beginning of the catalyst step is defined by the passage of the process gas stream (30) through the inlet (106) of the catalytic reaction apparatus (26) into the initial reheater (96).

Preferably, the outlet (108) of the catalytic reaction apparatus (26) is defined by the point or location of exit or passage of the process gas stream (30) out of the catalytic reaction apparatus (26). In the preferred embodiment, the outlet (108) is defined by the point or location of exit or passage of the process gas stream (30) out of the catalytic condenser (94) of the second subsequent catalytic reaction apparatus (88) into the tail gas line (104). Similarly, the end of the catalytic step is defined by the completion of the condensing step comprising the second subsequent catalytic step. In the preferred embodiment, the end of the catalytic step is defined by the passage of the process gas stream (30) through the outlet (108) of the catalytic reaction apparatus (26) into the tail gas line (104).

As indicated above, where desired, the catalytic step may be followed by an adjunct processing step, preferably a SUPERCLAUS™ step, prior to subsequent venting, incineration or disposal of the remaining process gas stream (30). Thus, adjunct equipment, preferably a SUPERCLAUS™ catalytic reaction apparatus (27), is located downstream of the catalytic reaction apparatus (26). In particular, the tail gas line or conduit (104) preferably conducts the process gas stream (30) from the catalytic reaction apparatus (26) to the SUPERCLAUS™ catalytic reaction apparatus (27) for further processing. A disposal line or conduit (105) subsequently conducts the process gas stream (30) away from the SUPERCLAUS™ catalytic reaction apparatus (27) for venting, incineration or disposal in an alternate manner.

Thus, the SUPERCLAUS™ catalytic reaction apparatus (27) is comprised of an inlet (107) and an outlet (109). Preferably, the inlet (107) of the SUPERCLAUS™ catalytic reaction apparatus (27) is defined by the point or location of first entry or passage of the process gas stream (30) into the SUPERCLAUS™ catalytic reaction apparatus (27) from the tail gas line (104). Similarly, the SUPERCLAUS™ step has a beginning and an end. Preferably, the beginning of the SUPERCLAUS™ step is defined by the commencement of the catalytic reaction thereof. In the preferred embodiment, the beginning of the SUPERCLAUS™ step is defined by the passage of the process gas stream (30) through the inlet (107) of the SUPERCLAUS™ catalytic reaction apparatus (27).

Preferably, the outlet (109) of the SUPERCLAUS™ catalytic reaction apparatus (27) is defined by the point or location of exit or passage of the process gas stream (30) out of the SUPERCLAUS™ catalytic reaction apparatus (27) and into the disposal line (105). Similarly, the end of the SUPERCLAUS™ step is defined by the completion of the catalytic reaction and the condensing and removal of any sulfur therefrom. In the preferred embodiment, the end of the SUPERCLAUS™ step is defined by the passage of the process gas stream (30) through the outlet (109) of the SUPERCLAUS™ catalytic reaction apparatus (27) into the disposal line (105).

As indicated, the present invention is directed at the control process for the sulfur recovery process and at the control system (20) for the sulfur recovery system (22). The control process and control system (22) are provided for reducing the effects of upset conditions on the recovery of sulfur (28) from the process gas stream (30). The control process and control system (22) are directed at reducing both the duration of the upset effect and the amplitude of the upset effect.

Upset conditions relate primarily to either a variation or sudden change in the flow rate of the hydrogen sulfide containing gas (32) combining with the oxygen containing gas (34) to form the process gas stream (30) or a variation or sudden change in the composition of the hydrogen sulfide containing gas (32), thereby causing a change in the initial composition of the process gas stream (30). As a result, a change in the flow rate of the hydrogen sulfide containing gas (32) must be followed by a corresponding adjustment in the flow rate of the oxygen containing gas (34) in order to maintain a desired or optimum initial ratio of hydrogen sulfide containing gas (32) to oxygen containing gas (34) (or $H_2S:O_2$ ratio) in the process gas stream (30). A change in the composition of the hydrogen sulfide containing gas (32) varies the desired or optimum initial ratio of hydrogen sulfide containing gas (32) to oxygen containing gas (34) (or $H_2S:O_2$ ratio) in the process gas stream (30) and requires an adjustment of the flow rate of the oxygen containing gas (34).

In the preferred embodiment, the control process and control system (22) provide for both feed forward control and feed back control. Feed forward control, also referred to as the load following part of the control process or control system (22), relates to the flow rate of the hydrogen sulfide containing gas (32). A change or variation in the flow rate of the hydrogen sulfide containing gas (32) is measured by the flowmeter (50). This information is utilized to adjust the flow rate of the oxygen containing gas (34), in the manner described in detail below.

Feed back control, also referred to as the ratio control part of the control process or control system (22), relates to the composition of the hydrogen sulfide containing gas (32) and thus the composition of the process gas stream (30). Presently, there are no viable accurate means for detecting or analyzing a change in the composition upstream of the thermal step or thermal reaction apparatus (24). Accordingly, the composition of the process gas stream (30) is subsequently analyzed to determine the initial or upstream composition. Conventionally, in the Claus processes and systems, with or without a SUPERCLAUS™ step, the composition of the process gas stream (30) is analyzed and determined at a single location downstream of the catalytic step or catalytic reaction apparatus (26). As a result, the response time, or the time required to adjust the flow of the oxygen containing gas (34) in response to a change in composition, is typically about 2 to 3 minutes or more at full load or capacity of the system.

In the present invention, the control process is comprised of first analyzing a composition of the process gas stream (30) at a first location (110) between the beginning of the thermal step and the end of the catalytic step. Further, the control process is comprised of second analyzing the composition of the process gas stream (30) at a second location (112) downstream of the end of the catalytic step. Correspondingly, the control system (20) is comprised of a first analyzer (114) for performing the first analyzing step at the first location (110) which is between the inlet (74) of the thermal reaction apparatus (24) and the outlet (108) of the catalytic reaction apparatus (26). Further, the control system (20) is comprised of a second analyzer (116) for performing the second analyzing step at the second location (112) which is downstream of the outlet (108) of the catalytic reaction apparatus (26).

Thus, the first location is upstream of the end of the catalytic step and the outlet (108) of the catalytic reaction apparatus (26), while the second location (112) is downstream of the end of the catalytic step and the outlet (108) of the catalytic reaction apparatus (26). Where performing the SUPERCLAUS™ step, the second location (112) is also preferably upstream of the SUPERCLAUS™ step and thus, upstream of the inlet (107) of the SUPERCLAUS™ catalytic reaction apparatus (27).

Further, in order to decrease the response time of the control process and system (20), it is desirable that the first location (110) be as close as practicable to the beginning of the thermal step and the inlet (74) of the thermal reaction apparatus (24). Thus, in the preferred embodiment, the first location (110) is upstream of the beginning of the catalytic step and upstream of the inlet (106) of the catalytic reaction apparatus (26). More particularly, the first location (110) is upstream of the initial reheating step of the initial catalytic step. Thus, in the control system (20), the first location (110) is upstream of the initial reheater (96) of the initial catalytic reaction apparatus (84).

As indicated, in order to decrease the response time of the control process and system (20), the first location (110) is as close as practicable to the beginning of the thermal step or the inlet (74) of the thermal reaction apparatus (24). However, it has been found that the closer the first location (110) is to the beginning of the thermal step or the inlet (74) of the thermal reaction apparatus (24), the higher the temperature and the higher the sulfur content of the process gas stream (30), both of which adversely impact the accuracy of the first analyzing step and the first analyzer (114).

Thus, in the preferred embodiment of the control process, the first location (110) is downstream of the end of the thermal step. Accordingly, the preferred first location, which is referred to in FIG. 1 by reference number (110a), is between the end of the thermal step and the beginning of the catalytic step. More particularly, the preferred first location (110a) is downstream of the thermal condensing step and upstream of the initial reheating step. In the preferred embodiment of the control system (20), the first location (110) is thus downstream of the outlet (76) of the thermal reaction apparatus (24). Accordingly, the preferred first location (110a) is between the outlet (76) of the thermal reaction apparatus (24) and the inlet (106) of the catalytic reaction apparatus (26). More particularly, the preferred first location (110a) is downstream of the thermal condenser (78) and upstream of the initial reheater (96), preferably at any position along the thermal condenser line (82). Referring to FIG. 1, the communication or connection of the first analyzer (114) with the preferred first location (110a) is shown by a solid line (118).

However, in an alternate embodiment, the first location (110) may be at any position upstream of the end of the thermal step or between the beginning and the end of the thermal step. Thus, the first location may be upstream of the outlet (76) of the thermal reaction apparatus (24) or between the inlet (74) and the outlet (76) of the thermal reaction apparatus (24). For instance, a first alternate first location, referred to in FIG. 1 by reference number (110b), is upstream of the thermal condensing step, and more particularly, downstream of the heating step and upstream of the thermal condensing step. Thus, in the control system (20), the first alternate first location (110b) is upstream of the thermal condenser (78), and more particularly, downstream of the waste heat boiler (72) and upstream of the thermal condenser (78), preferably at any position along the boiler line (80). Referring to FIG. 1, the communication or connection of the first analyzer (114) with the first alternate first location (110b) is shown by a dotted or broken line (120). Analysis of the composition of the process gas stream (30) at the first alternate first location (110b) is relatively less accurate, but permits a relatively shorter response time, as compared with the preferred first location (110a). Further, at the first alternate first location (110b), it has been found that there is a tendency for the sulfur (28) to recombine with the hydrogen gas in the process gas stream (30) to reform hydrogen sulfide gas, which may present difficulties with the analysis at this location.

Further, a second alternate first location, referred to in FIG. 1 by reference number (110c), is also upstream of the thermal condensing step, but more particularly, is during, within or associated with the heating step. Thus, in the control system (20), the second alternate first location (110c) is upstream of the waste heat boiler (72) and more particularly is within or associated with the reaction furnace (68). Referring to FIG. 1, the communication or connection of the first analyzer (114) with the second alternate first location (110c) is shown by a dotted or broken line (122). Analysis of the composition of the process gas stream (30) at the second alternate first location (110c) is relatively less accurate, but permits a relatively shorter response time, as compared with the first alternate first location (110b).

Thus, in comparing each of the first locations (110) discussed above, the preferred first location (110a) provides the most accurate analysis of the process gas stream (30) but has the longest response time. Typically, the response time at the preferred first location (110a) is less than about 30 seconds. The second alternate first location (110c) provides the least accurate analysis but has the shortest response time.

Referring to the second analyzing step and the second analyzer (116), the second location (112) is downstream of the end of the catalytic step and the outlet (108) of the catalytic reaction apparatus (26). In addition, where a SUPERCLAUS™ step is performed, the second location (112) is also preferably upstream of the beginning of the SUPERCLAUS™ step and the inlet (107) of the SUPERCLAUS™ catalytic reaction apparatus (27). Accordingly, in the preferred embodiment of the control system (20), the second location (112) is along the tail gas line (104) between the catalytic reaction apparatus (26) and the SUPERCLAUS™ catalytic reaction apparatus (27). Referring to FIG. 1, the communication or connection of the second analyzer (116) with the second location (112) is shown by a solid line (123).

Given the relative positions of the first location (110) and the second location (112), each of the first and second locations (110, 112) also differ with respect to the accuracy of the analysis of the composition of the process gas stream (30) and the response time. In particular, the analysis at the preferred first location (110a) provides a relatively quicker or faster response time for the control process or system (20), typically less than about 30 seconds, which is more reflective of the actual process conditions as compared with the response time for the analysis at the second location (112), typically about 2 to 3 minutes, which is less reflective of the actual process conditions. However, the analysis at the preferred first location (110a) provides a relatively less accurate measure of the composition of the process gas stream (30) and the process conditions as compared with the analysis at the second location (112).

As a result, the control process and system (20) utilize both the first and second analyzing steps and the first and second analyzers (114, 116) respectively in order to obtain the benefits of the analysis at both the first and second locations (110, 112). The first analyzing step and first analyzer (114) provide a relatively fast main control mechanism for adjusting the flow of the oxygen containing gas (34), as discussed in detail below. The second analyzing step and second analyzer (116) provide a relatively slow trim control mechanism for adjusting the flow of the oxygen containing gas (34), as discussed in detail below. Thus, by combining the main and trim control mechanisms using an appropriate algorithm and computer modeling, the flow of the oxygen containing gas (34) may be more precisely controlled and the duration and amplitude of the effect of any upset may be reduced.

In the preferred embodiment of the control process, the first and second analyzing steps are each comprised of analyzing the composition of the process gas stream (30) with respect to the hydrogen sulfide and sulfur dioxide content. In particular, referring to the first analyzing step, a first sample of the process gas stream (30) is obtained at the first location (110), preferably the preferred first location (110a). The first sample is then analyzed to obtain a first measured indication which is reflective of the hydrogen sulfide and sulfur dioxide content of the sample. Similarly, with respect to the second analyzing step, a second sample of the process gas stream (30) is obtained at the second location (112) and the second sample is analyzed to obtain a second measured indication which is reflective of the hydrogen sulfide and sulfur dioxide content of the second sample.

In the preferred embodiment of the control system (20), the first and second analyzers (114, 116) are each configured to conduct the first and second analyzing steps respectively. Thus, the first analyzer (114) is configured to obtain the first sample at the first location (110) and to analyze the first sample to obtain the first measured indication. The second analyzer (116) is configured to obtain the second sample at the second location (112) and to analyze the second sample to obtain the second measured indication. The first and second measured indications are preferably reflective of at least the hydrogen sulfide and sulfur dioxide content. Further, the first and second measured indications may be reflective of the content by providing a measure or quantification of the actual content or amount of one or both of the hydrogen sulfide and sulfur dioxide in the first and second samples respectively. However, preferably, the first and second measured indications are reflective of the content by providing a measure or quantification of the ratio of hydrogen sulfide to sulfur dioxide.

Each of the first and second analyzers (114, 116) may be comprised of any type or configuration of analyzer or analyzing device or mechanism capable of, and suitable for, performing the first and second analyzing steps respectively. However, preferably, each of the first and second analyzers (114, 116) is comprised of any known, standard or conventional air demand analyzer, which may also be referred to as a tail gas analyzer. In the preferred embodiment, each analyzer (114, 116) is a Model BRM 942-TG Tail Gas Analyzer manufactured by Brimstone Instrumentation Ltd. Alternately, each analyzer (114, 116) may be a Model IPM 300TG Tail Gas Analyzer manufactured by NovaChem BV, or a Model 900 Tail Gas/Air Demand Analyzer-900 manufactured by Ametek Process Instruments.

Finally, the control process includes one or more controlling steps for providing the feed forward and feed back control discussed previously. Similarly, the control system (22) is comprised of one or more controllers or control mechanisms for providing the feed forward and feed back controls. With respect to the feed back control, the control process is further comprised of first controlling and second controlling the amount of the oxygen containing gas (34) having regard to the composition of the process gas stream (30) at the first and second locations (110, 122) respectively. Similarly, the control system (20) is further comprised of a first controller (124) and a second controller (126). The first controller (124) is associated with the first analyzer (114), operatively connected with the flow control apparatus (62) and configured to perform the tasks of the first controlling step. The second controller (126) is associated with the second analyzer (116), operatively connected with the flow control apparatus (62) and configured to perform the tasks of the second controlling step. However, in the preferred embodiment, the first and second controlling steps are comprised of a combined controlling step. Thus, in the preferred embodiment, the first and second controllers (124, 126) are comprised of a combined controller apparatus (128) configured to perform the tasks of the combined controlling step.

Where performed separately from the second controlling step, the first controlling step compares the first measured indication, wherein the transmission or communication of the first measured indication is shown by line (130), with a first target indication which is reflective of a target hydrogen sulfide and a target sulfur dioxide content of the process gas stream (30) at the first location (110) in order to obtain a first comparison parameter. A first control or electrical signal, as shown by lines (132), is generated from the first comparison parameter and used to control the amount of the oxygen containing gas (34). In particular, the first control signal (132) is transmitted to the flow control apparatus (62) in order to vary or change the flow of the oxygen containing gas (34) as required to achieve the first target indication.

Where performed separately from the first controlling step, the second controlling step compares the second measured indication, wherein the transmission or communication of the second measured indication is shown by line (134), with a second target indication which is reflective of a target hydrogen sulfide and a target sulfur dioxide content of the process gas stream (30) at the second location (112) in order to obtain a second comparison parameter. A second control or electrical signal, as shown by lines (136), is generated from the second comparison parameter and used to control the amount of the oxygen containing gas (34). In particular, the second control signal (136) is transmitted to the flow control apparatus (62) in order to vary or change the flow of the oxygen containing gas (34) as required to achieve the second target indication.

Each of the first and step controlling steps control the amount of the oxygen containing gas (34) by varying or adjusting the flow of the oxygen containing gas (34) from the source (38) by each varying or adjusting one or both of the main and trim valves (64, 66). If desired, one of the first and second controlling steps may control one of the main and trim valves (64, 66), while the other of the first and second controlling steps controls the other of the main and trim valves (64, 66). For instance, the first controlling step may adjust or vary the main valve (64), while the second controlling step adjusts or varies the trim valve (66). However, in the preferred embodiment, both of the first and second controlling steps control both of the main and trim valves (64, 66). Thus, the main and trim valves (64, 66) are operated concurrently upon transmission of either of the first and second control signals (132, 136).

However, as stated, in the preferred embodiment, the first and second controlling steps comprise a combined controlling step. The combined controlling step compares the first measured indication (130) with the first target indication in order to obtain the first comparison parameter. Further, the second measured indication (134) is compared with the second target indication in order to obtain the second comparison parameter. A combined control or electrical signal, as shown by lines (138), is then generated from the first comparison parameter and the second comparison parameter and used to control the amount of the oxygen containing gas (34). In particular, the combined control signal (138) is transmitted to the flow control apparatus (62) in order to vary or change the flow of the oxygen containing gas (34) as required to achieve the first and second target indications. Thus, in the preferred embodiment, the combined controlling step controls both the main and trim valves (64, 66). Thus, the main and trim valves (64, 66) are operated concurrently upon transmission of the combined control signal (138).

The first and second target indications are preferably reflective of at least a target hydrogen sulfide and a target sulfur dioxide content. Further, the first and second target indications may be reflective of the target content by providing a target or desired measure or quantification of the actual content or amount of one or both of the hydrogen sulfide and sulfur dioxide. However, preferably, the first and second target indications are reflective of the target content by providing a target or desired measure or quantification of the ratio of hydrogen sulfide to sulfur dioxide. For instance, in the preferred embodiment, the target ratio of hydrogen sulfide to sulfur dioxide is typically 2:1 for the Claus process.

In addition to the feed back control discussed above, the control process and control system (20) also preferably provide feed forward control related to the flow of the hydrogen sulfide containing gas (32) to initially form the process gas stream (30). In particular, a first flow indication, wherein the transmission or communication of the first flow indication is shown by line (140), is preferably provided to the combined controller apparatus (128) from the flow meter (50) which is reflective of the actual flow rate of the hydrogen sulfide containing gas (32) through the hydrogen sulfide containing gas line (48). Where separate or distinct flowmeters are provided for each of the amine acid gas stream (42), the sour water stripper gas stream (44) and the natural gas stream (46), the first flow indication (140) is preferably reflective of the actual flow of each of the streams (42, 44, 46). The first flow indication is compared with a preset flow indication reflective of the anticipated flow of the hydrogen sulfide containing gas (32), or alternately reflective of the anticipated flow of each of the streams (42, 44, 46), to obtain a flow comparison parameter. A separate or distinct control signal may be generated from the flow comparison parameter and transmitted to the flow control apparatus (62), and particularly to one or both of the main and trim valves (64, 66). However, preferably, the combined control signal (138) takes into account, and is further generated from, the flow comparison parameter.

Finally, if desired, a second flow indication, wherein the transmission or communication of the second flow indication is shown by line (142), may be provided to the combined controller apparatus (128) from the main flow meter (58) which is reflective of the actual flow rate of the oxygen containing gas (34) through the main line portion (54) of the oxygen containing gas line (52). Similarly, if desired, a third flow indication, wherein the transmission or communication of the third flow indication is shown by line (144), may be provided to the combined controller apparatus (128) from the trim flow meter (60) which is reflective of the actual flow rate of the oxygen containing gas (34) through the trim line portion (56) of the oxygen containing gas line (52). Preferably, the combined control signal (138) further takes into account, and is further generated from, the parameters generated by the second and third flow indications (142, 144).

Thus, in summary, in the preferred embodiment, the combined controller apparatus (128) performs the combined controlling step by receiving the first measured indication (130) from the first analyzer (114), the second measured indication (134) from the second analyzer (116), the first flow indication (140) from the flow meter (50), the second flow indication (142) from the main flow meter (58) and the third flow indication (144) from the trim flow meter (60). Further, the combined controller apparatus (128) performs the combined controlling step by generating the combined control signal (138) from each of the indications (130, 134, 140, 142, 144) and transmitting the combined control signal (138) concurrently to the main and trim valves (64, 66) to adjust or vary the flow of the oxygen containing gas (34) therethrough. Thus, the combined controller apparatus (128) either continuously or intermittently polls or samples the various inputs provided by the indications (130, 134, 140, 142, 144), process the values and updates the output provided by the transmission of the combined control signal (138). The frequency or regularity at which the sampling and updating occur may vary depending upon the overall sulfur recovery process and system (22). However, preferably, polling or sampling of at least the first and second measured indications (130, 134) and updating of the combined control signal (138) occurs between about every 10 milliseconds and every second.

With respect to the operation of the main and trim valves (64, 66), in the preferred embodiment, the two valves (64, 66) are controlled or operated concurrently or simultaneously. With respect to a change in the flow rate of the hydrogen sulfide containing gas (32), both valves (64, 66) are actuated. The main valve (64) delivers the bulk or larger proportion of the necessary oxygen containing gas (32) flow change, thus providing a relatively fast control mechanism. The trim valve (66) delivers the smaller proportion of the necessary oxygen containing gas (32) flow change, thus providing the desired accuracy of the change. After the desired change in the flow is effected, the trim valve (66) is moved slowly back to its original position, with a corresponding movement of the main valve (64), to prepare the trim valve (66) for the next necessary flow change. With respect to the composition of the process gas stream (30) at the first and second locations (110, 112), both the main and trim valves (64, 66) are adjusted constantly to provide the desired or optimum initial ratio of hydrogen sulfide and oxygen in the process gas stream (30). Typically, the first measured indication (130) at the first location (110) is used to provide a relatively fast, but courser, adjustment in the flow of the oxygen containing gas (34), while the second measured indication (134) at the second location (112) is used to provide a relatively slow, but finer, adjustment in the flow of the oxygen containing gas (34).

Figure 2:
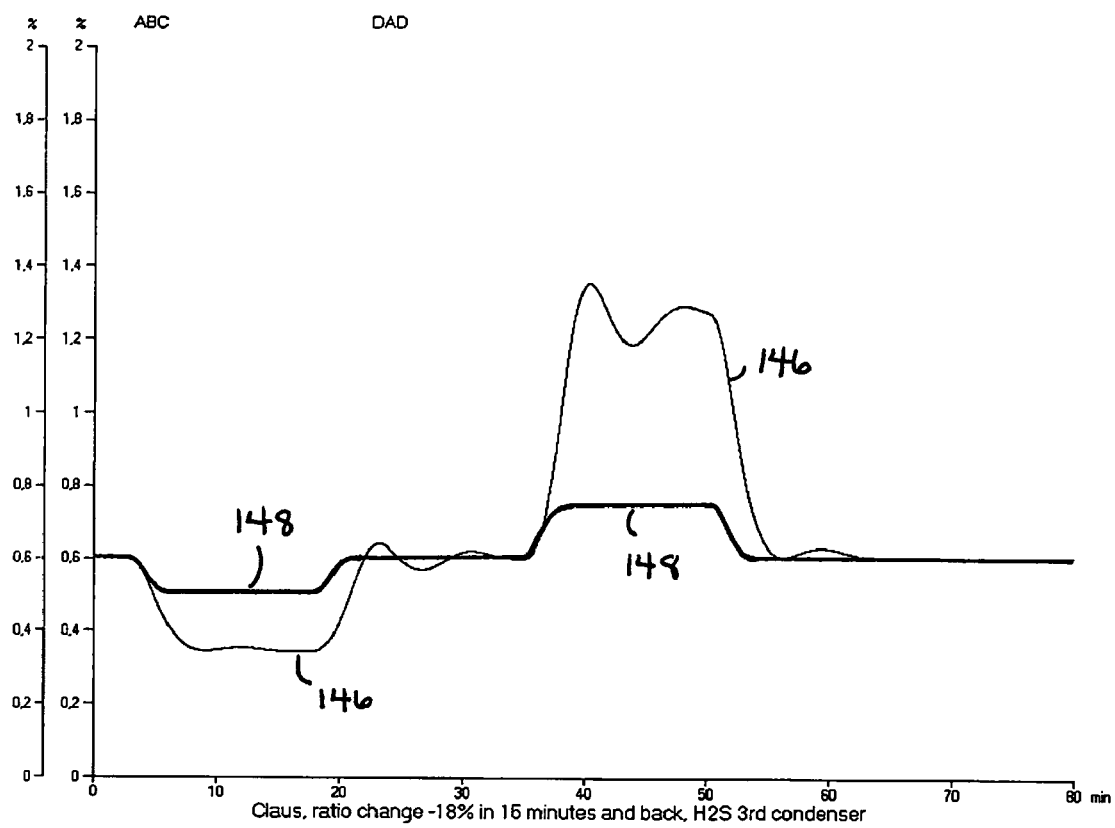
FIG. 2 is a graph depicting data provided by a computer generated model of the Claus sulfur recovery process conducted with and without the preferred embodiment of the invention, wherein the graph depicts the effect of an upset causing an 18% change in the initial ratio of hydrogen sulfide ($H_2S$) to oxygen ($O_2$) in the process gas stream, maintained for a period of 15 minutes, on the percentage of $H_2S$ in the process gas stream as measured at the second location downstream of the end of the catalytic step, being downstream of the outlet of the catalytic reaction apparatus, as described herein.
Figure 3:
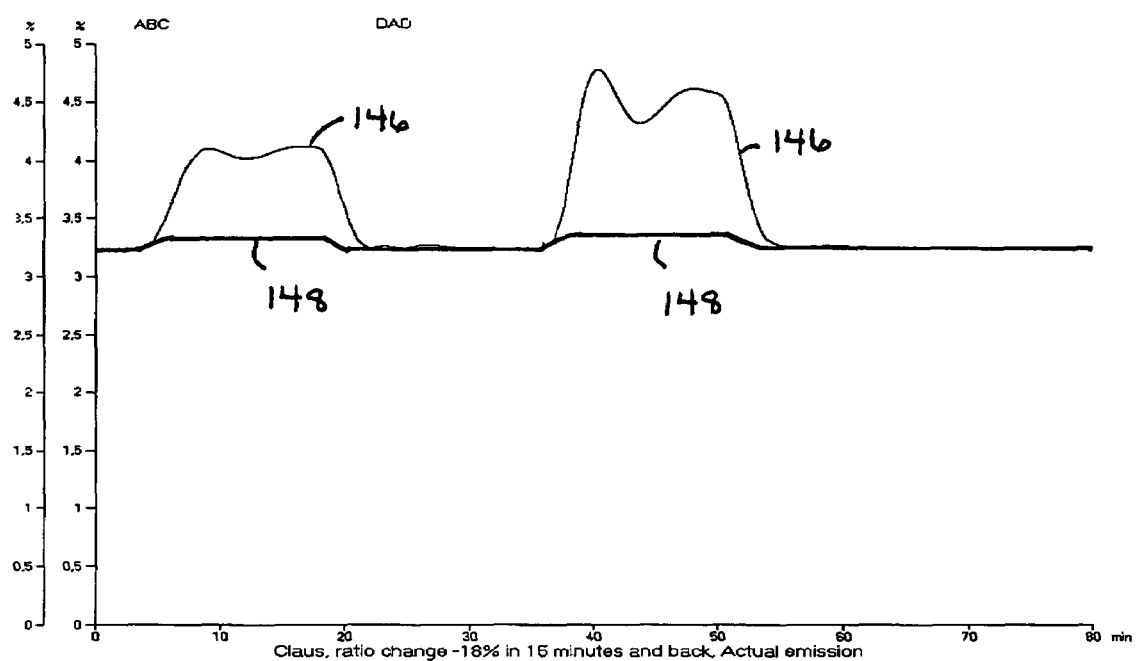
FIG. 3 is a graph depicting data provided by the computer generated model of the Claus sulfur recovery process conducted with and without the preferred embodiment of the invention, wherein the graph depicts the effect of the upset of FIG. 2 on the total sulfur emission or sulfur content of the process gas stream as measured at the second location, as described for FIG. 2, and expressed as a percentage of the sulfur content of the initial process gas stream at the inlet of the thermal reaction apparatus.
Figure 4:
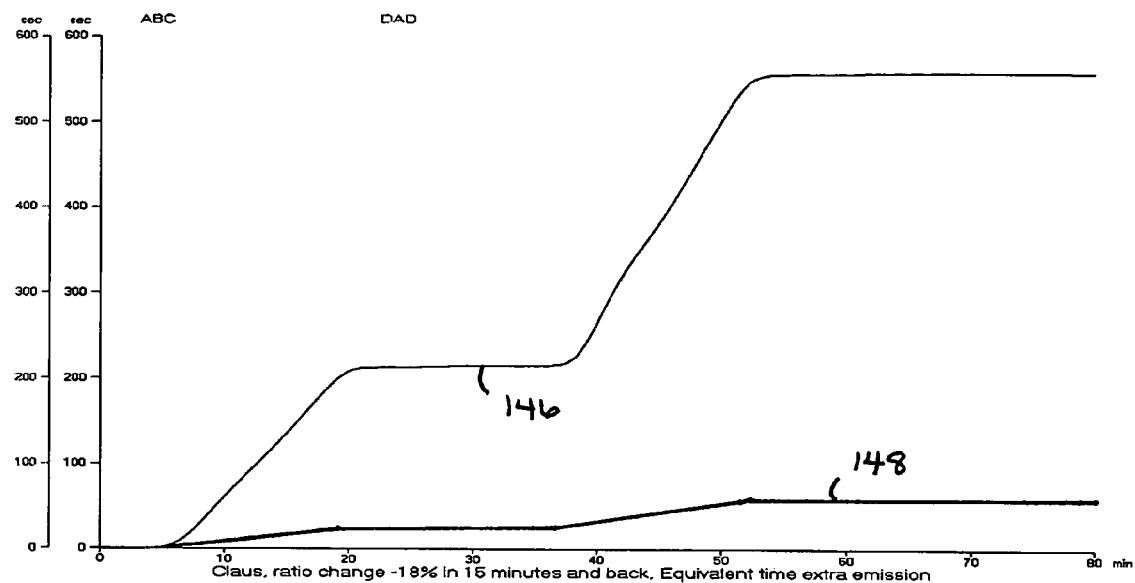
FIG. 4 is an alternate graphical representation of the data of FIG. 3, wherein the graph depicts the effect of the upset of FIG. 2 on the total sulfur emission expressed as equivalent time extra emission.
Figure 6:
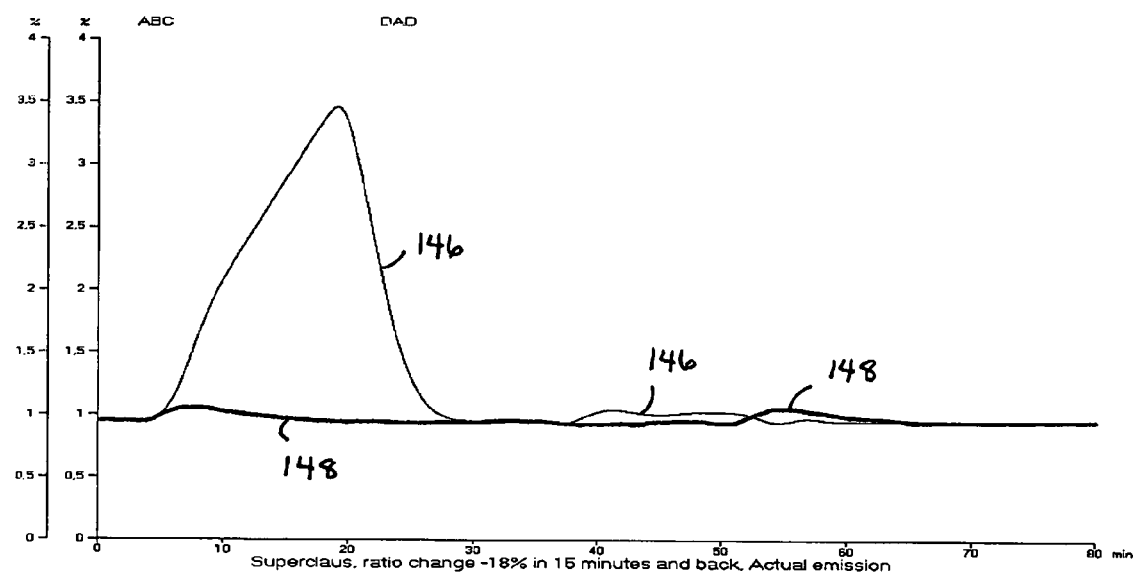
FIG. 6 is a graph depicting data provided by the computer generated model of the Claus sulfur recovery process, including a subsequent SUPERCLAUS™ step, conducted with and without the preferred embodiment of the invention, wherein the graph depicts the effect of the upset of FIG. 5 on the total sulfur emission or sulfur content of the process gas stream as measured at a location downstream of the end of the SUPERCLAUS™ step, being downstream of the outlet of the SUPERCLAUS™ catalytic reaction apparatus, and expressed as a percentage of the sulfur content of the initial process gas stream at the inlet of the thermal reaction apparatus.
Figure 7:
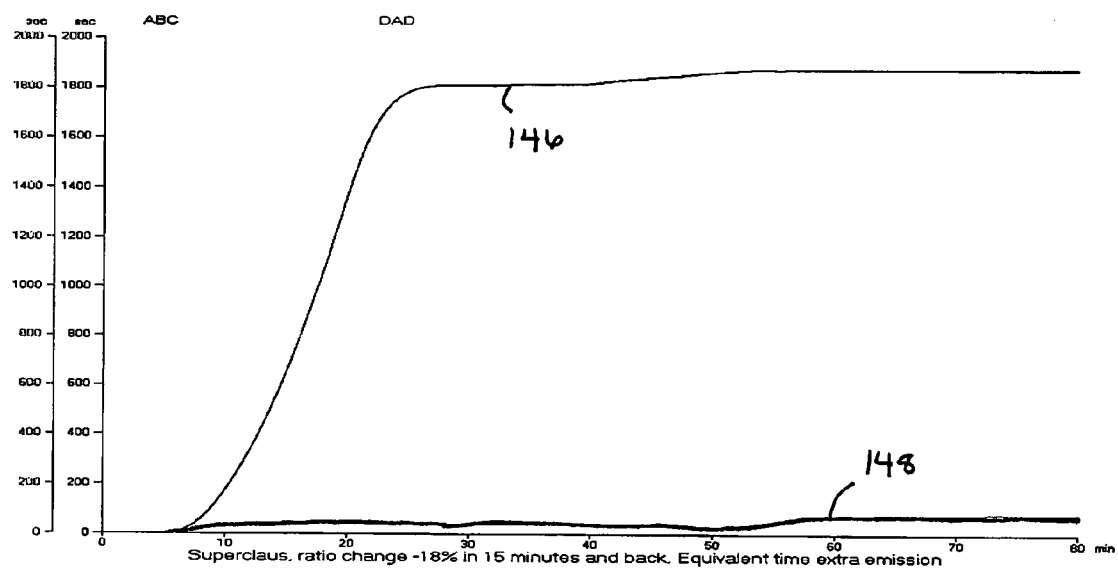
FIG. 7 is an alternate graphical representation of the data of FIG. 6, wherein the graph depicts the effect of the upset of FIG. 5 on the total sulfur emission expressed as equivalent time extra emission.

Referring to FIGS. 2 to 4, various graphs are shown which are provided by a computer generated model of the Claus sulfur recovery process conducted with and without the control process and system (20) of the present invention. Similarly, FIGS. 5 to 7 show various graphs which are provided by a computer generated model of the Claus sulfur recovery process, including a subsequent SUPERCLAUS™ step, conducted with and without the control process and system (20) of the present invention.

A first graph line (146) shows the results when the control process includes a feed forward control related to the flow of the hydrogen sulfide containing gas (32) and a feed back control related to the composition of the process gas stream (30) at the second location (112) only. A second graph line (148) shows the results when the control process includes a feed forward control related to the flow of the hydrogen sulfide containing gas (32) and a feed back control related to the composition of the process gas stream (30) at both the preferred first location (110a) and the second location (112).

Figure 5:
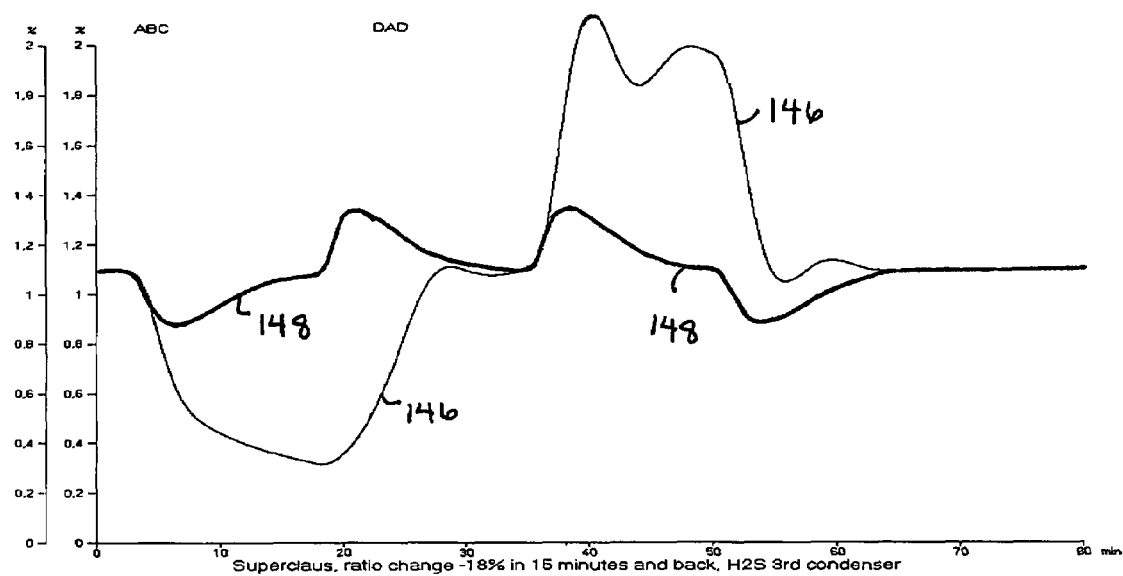
FIG. 5 is a graph depicting data provided by a computer generated model of the Claus sulfur recovery process, including a subsequent SUPERCLAUS™ step, conducted with and without the preferred embodiment of the invention, wherein the graph depicts the effect of an upset causing an 18% change in the initial ratio of $H_2S$ to $O_2$ in the process gas stream, maintained for a period of 15 minutes, on the percentage of $H_2S$ in the process gas stream as measured at the second location downstream of the end of the catalytic step and upstream of the beginning of the SUPERCLAUS™ step, being downstream of the outlet of the catalytic reaction apparatus and upstream of the inlet of the SUPERCLAUS™ catalytic reaction apparatus, as described herein.

Referring to FIGS. 2 and 5, the graphs depict the effect of an upset comprised of an 18% change in the initial ratio of $H_2S$ to $O_2$ in the process gas stream (30) which is maintained for a period of 15 minutes. The effect is shown as the change in the percentage of $H_2S$ in the process gas stream (30) as measured at the second location (112). In FIGS. 2 and 5, the second location (112) is downstream of the end of the catalytic step, being downstream of the outlet (108) of the catalytic reaction apparatus (26). In FIG. 5, the second location (112) is also upstream of the beginning of the SUPER-CLAUS™ step, being upstream of the inlet (107) of the SUPERCLAUS™ catalytic reaction apparatus (27).

The graph of FIG. 3 depicts the effect of the upset of FIG. 2 on the total sulfur emission or sulfur content of the process gas stream (30) as measured at the second location (112) downstream of the end of the catalytic step, being downstream of the outlet (108) of the catalytic reaction apparatus (26). The total sulfur emission or sulfur content of the process gas stream (30) at the second location (112) is expressed as a percentage of the sulfur content of the initial process gas stream (30) at the inlet (74) of the thermal reaction apparatus (24).

FIG. 4 is an alternate graphical representation of the data of FIG. 3 depicting the effect of the upset on the total sulfur emission, which is expressed as equivalent time extra emission. In FIG. 4 it can be seen that there are two steps in the equivalent time emission curve which correspond to the two peaks in the total sulfur emission curve from FIG. 3.

The graph of FIG. 6 depicts the effect of the upset of FIG. 5 on the total sulfur emission or sulfur content of the process gas stream (30) as measured at a location downstream of the end of the SUPERCLAUS™ step, being downstream of the outlet (109) of the SUPERCLAUS™ catalytic reaction apparatus (27). The total sulfur emission or sulfur content of the process gas stream (30) at the location downstream of the SUPERCLAUS™ catalytic reaction apparatus (27) is expressed as a percentage of the sulfur content of the initial process gas stream (30) at the inlet (74) of the thermal reaction apparatus (24).

FIG. 7 is an alternate graphical representation of the data of FIG. 6 depicting the effect of the upset on the total sulfur emission, which is expressed as equivalent time extra emission. In FIG. 7 it can be seen that there are two steps in the equivalent time emission curve which correspond to the two peaks in the total sulfur emission curve from FIG. 6.

As is shown by the graph lines (146, 148) in FIGS. 2-3 for the Claus process without a SUPERCLAUS™ step, and in FIGS. 5-6 for the Claus process with a SUPERCLAUS™ step, the duration and amplitude of the effect of the upset is reduced when using the control process and system (20) of the present invention. As a result, as shown in FIG. 4 for the Claus process without the SUPERCLAUS™ step, and in FIG. 7 for the Claus process with the SUPERCLAUS™ step, the equivalent time of extra emission is also reduced when using the control process and system (20) of the present invention.

The embodiments of the invention in which an exclusive property is claimed are defined as follows:

1. In a system for recovering sulfur from a process gas stream initially comprising an amount of a hydrogen sulfide containing gas and an amount of an oxygen containing gas, the system comprising a thermal reaction apparatus, a catalytic reaction apparatus downstream of the thermal reaction apparatus, a source of the oxygen containing gas and a flow control apparatus associated with the source of the oxygen containing gas, the thermal reaction apparatus comprising an inlet and an outlet, the catalytic reaction apparatus comprising an inlet and an outlet, a control system comprising:

(a) a first analyzer for analyzing a composition of the process gas stream at a first location between the inlet of the thermal reaction apparatus and the outlet of the catalytic reaction apparatus;

(b) a first controller associated with the first analyzer and operatively connected with the flow control apparatus, for controlling the amount of the oxygen containing gas having regard to the composition of the process gas stream at the first location;

(c) a second analyzer for analyzing a composition of the process gas stream at a second location downstream of the outlet of the catalytic reaction apparatus; and (d) a second controller associated with the second analyzer and operatively connected with the flow control apparatus, for controlling the amount of the oxygen containing gas having regard to the composition of the process gas stream at the second location.

2. The control system as claimed in claim 1 wherein the first location is between the inlet of the thermal reaction apparatus and the inlet of the catalytic reaction apparatus.

3. The control system as claimed in claim 1 wherein the first location is between the outlet of the thermal reaction apparatus and the inlet of the catalytic reaction apparatus.

4. The control system as claimed in claim 1 wherein the thermal reaction apparatus is comprised of a condenser for condensing the process gas stream and wherein the first location is between the condenser and the inlet of the catalytic reaction apparatus.

5. The control system as claimed in claim 1 wherein the catalytic reaction apparatus is comprised of a reheater for reheating the process gas stream and wherein the first location is between the outlet of the thermal reaction apparatus and the reheater.

6. The control system as claimed in claim 5 wherein the catalytic reaction apparatus is comprised of an initial catalytic reaction apparatus and at least one subsequent catalytic reaction apparatus and wherein the reheater is comprised of an initial reheater which is associated with the initial catalytic reaction apparatus.

7. The control system as claimed in claim 1 wherein the thermal reaction apparatus is comprised of a condenser for condensing the process gas stream, wherein the catalytic reaction apparatus is comprised of a reheater for reheating the process gas stream, and wherein the first location is between the condenser and the reheater.

8. The control system as claimed in claim 1 wherein the thermal reaction apparatus is comprised of a condenser for condensing the process gas stream and wherein the first location is between the inlet of the thermal reaction apparatus and the condenser.

9. The control system as claimed in claim 2 wherein the first analyzer and the second analyzer are each configured to analyze the composition of the process gas stream with respect to hydrogen sulfide and sulfur dioxide content.

10. The control system as claimed in claim 9 wherein the first controller and the second controller are comprised of a combined controller apparatus.

11. The control system as claimed in claim 9 wherein the first analyzer is configured to perform the following tasks:
(i) obtain a sample of the process gas stream at the first location; and
(ii) analyze the sample to obtain a first measured indication which is reflective of the hydrogen sulfide and sulfur dioxide content of the sample.

12. The control system as claimed in claim 11 wherein the second analyzer is configured to perform the following tasks:
(i) obtain a sample of the process gas stream at the second location; and
(ii) analyze the sample to obtain a second measured indication which is reflective of the hydrogen sulfide and sulfur dioxide content of the sample.

13. The control system as claimed in claim 12 wherein the first controller is configured to perform the following tasks:
(i) compare the first measured indication with a first target indication which is reflective of a target hydrogen sulfide and a target sulfur dioxide content of the process gas stream at the first location in order to obtain a first comparison parameter;
(ii) generate a first control signal from the first comparison parameter; and
(iii) transmit the first control signal to the flow control apparatus in order to control the amount of the oxygen containing gas.

14. The control system as claimed in claim 12 wherein the second controller is configured to perform the following tasks:
(i) compare the second measured indication with a second target indication which is reflective of a target hydrogen sulfide and a target sulfur dioxide content of the process gas stream at the second location in order to obtain a second comparison parameter;
(ii) generate a second control signal from the second comparison parameter; and
(iii) transmit the second control signal to the flow control apparatus in order to control the amount of the oxygen containing gas.

15. The control system as claimed in claim 14 wherein the first controller is configured to perform the following tasks:
(i) compare the first measured indication with a first target indication which is reflective of a target hydrogen sulfide and a target sulfur dioxide content of the process gas stream at the first location in order to obtain a first comparison parameter;
(ii) generate a first control signal from the first comparison parameter; and
(iii) transmit the first control signal to the flow control apparatus in order to control the amount of the oxygen containing gas.

16. The control system as claimed in claim 12 wherein the first controller and the second controller are comprised of a combined controller apparatus.

17. The control system as claimed in claim 16 wherein the combined controller apparatus is configured to perform the following tasks:
(i) compare the first measured indication with a first target indication which is reflective of a target hydrogen sulfide and a target sulfur dioxide content of the process gas stream at the first location in order to obtain a first comparison parameter;
(ii) compare the second measured indication with a second target indication which is reflective of a target hydrogen sulfide and a target sulfur dioxide content of the process gas stream at the second location in order to obtain a second comparison parameter;
(iii) generate a combined control signal from the first comparison parameter and the second comparison parameter; and
(iv) transmit the combined control signal to the flow control apparatus in order to control the amount of the oxygen containing gas.

* * * * *